(12) United States Patent
Iwaasa

(10) Patent No.: US 10,614,639 B2
(45) Date of Patent: Apr. 7, 2020

(54) IN-VEHICLE CONTROL DEVICE AND IN-VEHICLE RECORDING SYSTEM

(71) Applicant: TOYOTA JIDOSHA KABUSHIKI KAISHA, Toyota-shi, Aichi-ken (JP)

(72) Inventor: Shintaro Iwaasa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 15/997,294

(22) Filed: Jun. 4, 2018

(65) Prior Publication Data
US 2018/0286152 A1    Oct. 4, 2018

Related U.S. Application Data

(63) Continuation of application No. 15/348,317, filed on Nov. 10, 2016, now Pat. No. 10,102,696.

(30) Foreign Application Priority Data

Nov. 20, 2015    (JP) .................................. 2015-228007

(51) Int. Cl.
  *B60W 50/08*   (2020.01)
  *G07C 5/08*    (2006.01)
  *B60W 50/14*   (2020.01)

(52) U.S. Cl.
  CPC ........... *G07C 5/0841* (2013.01); *B60W 50/08* (2013.01); *B60W 2050/143* (2013.01);
  (Continued)

(58) Field of Classification Search
  CPC ................ B60W 50/14; B60W 50/08; B60W 2050/143; B60W 2550/10; G07C 5/0841; G07C 5/085
  (Continued)

(56) References Cited

U.S. PATENT DOCUMENTS 8,520,695 B1 *   8/2013   Rubin .................... G08G 9/02
                                                        370/445
9,248,841 B1 *   2/2016   MacNeille ............ B60W 50/08
(Continued)

FOREIGN PATENT DOCUMENTS

CN      104487309 A      4/2015
JP    2000-293499 A     10/2000
(Continued)

OTHER PUBLICATIONS

Mar. 2, 2018 Notice of Allowance issued in U.S. Appl. No. 15/348,317.
(Continued)

*Primary Examiner* — Thomas G Black
*Assistant Examiner* — Wae L Louie
(74) *Attorney, Agent, or Firm* — Oliff PLC

(57) ABSTRACT

An in-vehicle recording system of a vehicle includes a detector including at least a front camera; an electronic control unit configured to control a rudder angle to keep the vehicle within a traveling lane based on information on at least images in front of the vehicle detected by the front camera; a control area network; a gateway device connected to the control area network; a data recording electronic control unit configured to sequentially record a status data that includes at least images transferred through the control area network and the gateway device, and when an event occurs, record on a nonvolatile memory the status data relating to the event that occurs, among the status data over a predetermined time before and after occurrence of the event.

5 Claims, 16 Drawing Sheets

(52) U.S. Cl.
CPC ... *B60W 2050/146* (2013.01); *B60W 2550/10* (2013.01); *G07C 5/085* (2013.01)

(58) Field of Classification Search
USPC ........................................................ 701/33.4
See application file for complete search history.

(56) References Cited

U.S. PATENT DOCUMENTS

| | | | | |
|---|---|---|---|---|
| 9,327,841 | B1* | 5/2016 | Sipper | B64D 45/00 |
| 9,800,319 | B2* | 10/2017 | Nakagawa | H04B 7/15528 |
| 2007/0280505 | A1* | 12/2007 | Breed | B60W 40/08 382/104 |
| 2008/0150786 | A1* | 6/2008 | Breed | B60N 2/2863 342/53 |
| 2009/0033540 | A1* | 2/2009 | Breed | B60N 2/2863 342/29 |
| 2010/0332072 | A1* | 12/2010 | Ishiko | B60T 17/221 701/29.5 |
| 2013/0166778 | A1* | 6/2013 | Ishigooka | H04L 12/4035 709/248 |
| 2014/0257594 | A1 | 9/2014 | Hashimoto et al. | |
| 2014/0306799 | A1* | 10/2014 | Ricci | H04W 4/21 340/5.83 |
| 2014/0306817 | A1* | 10/2014 | Ricci | G05D 1/0016 340/457 |
| 2015/0191176 | A1 | 7/2015 | Kobana et al. | |
| 2015/0360698 | A1* | 12/2015 | Beyene | B60W 40/09 701/41 |
| 2016/0055747 | A1* | 2/2016 | Ricci | H04W 4/90 701/117 |
| 2016/0082978 | A1* | 3/2016 | Ozaki | G01C 21/34 701/58 |
| 2016/0364921 | A1* | 12/2016 | Iyoda | G07C 5/008 |
| 2017/0111183 | A1 | 4/2017 | Kojima | |
| 2017/0132710 | A1* | 5/2017 | Duncan | G06Q 40/08 |
| 2017/0148237 | A1* | 5/2017 | Iwaasa | B60W 50/08 |
| 2018/0286152 | A1* | 10/2018 | Iwaasa | B60W 50/08 |

FOREIGN PATENT DOCUMENTS

| | | |
|---|---|---|
| JP | 2010-166160 A | 7/2010 |
| JP | 2012-003607 A | 1/2012 |
| JP | 2012-156803 A | 8/2012 |
| JP | 2013-073610 A | 4/2013 |
| JP | 2014-211756 A | 11/2014 |
| JP | 2014-219814 A | 11/2014 |
| JP | 2015-162068 A | 9/2015 |
| JP | 2015-194938 A | 11/2015 |
| JP | 2017-079406 A | 4/2017 |
| WO | 2013-057842 A1 | 4/2013 |

OTHER PUBLICATIONS

May 17, 2018 Supplemental Notice of Allowability issued in U.S. Appl. No. 15/348,317.
U.S. Appl. No. 15/266,303, filed Sep. 15, 2016 in the name of Takashi Kojima.
Jul. 11, 2018 Supplemental Notice of Allowability issued in U.S. Appl. No. 15/348,317.
Apr. 11, 2018 Office Action issued in U.S. Appl. No. 15/266,303.
Oct. 4, 2018 Ofifce Action issued in U.S. Appl. No. 15/266,303.
Mar. 27, 2019 Corrected Notice of Allowability issued in U.S. Appl. No. 15/266,303.
Jun. 25, 2018 Notice of Allowance issued in U.S. Appl. No. 15/348,317.
Dec. 13, 2018 Notice of Allowance issued in U.S. Appl. No. 15/226,303.

* cited by examiner

FIG. 10

| EVENT ID | NAME OF EVENT ITEM | RECORDING TIME (α SECOND BEFORE OCCURRENCE) | RECORDING TIME (β SECOND AFTER OCCURRENCE) |
|---|---|---|---|
| 1 | HIGH ACCELERATOR OPENING AT LOW-SPEED AREA | 5 | 5 |
| 2 | HIGH ACCELERATOR OPENING AT MIDDLE-SPEED AREA | 5 | 5 |
| 3 | PCS ACTUATION HISTORY | 10 | 10 |
| ⋮ | ⋮ | ⋮ | ⋮ |

FIG. 11

| STATUS DATA | EVENT ID |
|---|---|
| VEHICLE SPEED | 1, 2, 3, ··· |
| ACCELERATOR OPENING RATIO | 1, 2, 3, ··· |
| ENGINE SPEED | 1, 2, 3, ··· |
| ⋮ | ⋮ |

FIG. 12

| SUBSEQUENT CHANGE ID | SUBSEQUENT CHANGE EVENT | EXPECTED TIME | THRESHOLD |
|---|---|---|---|
| A001 | EXTREMELY LOW-SPEED TRAVEL | 1 MINUTE | 5 km/h |
| A002 | VEHICLE STOP | 5 MINUTES | 0 km/h |
| A003 | HAZARD LAMP FLASHING | 1 MINUTE | — |
| A004 | PCS ON-OFF SWITCHING | 5 MINUTES | — |
| A005 | COMMUNICATION TO CALL CENTER | 10 MINUTES | — |
| A006 | IG ON-OFF SWITCHING | 3 MINUTES | — |
| A007 | DETECTION OF BRAKE OIL PRESSURE EQUAL TO OR ABOVE SPECIFIED LEVEL | 10 SECONDS | XXX |
| A008 | DETECTION OF STEERING TORQUE EQUAL TO OR ABOVE SPECIFIED LEVEL | 10 SECONDS | XXY |
| A009 | RATE OF CHANGE IN HEART RATE EQUAL TO OR ABOVE SPECIFIED LEVEL | 10 SECONDS | YYX |
| A010 | HEART RATE EQUAL TO OR ABOVE SPECIFIED BPM | 30 SECONDS | YXX |

FIG. 13

EVENT ID=3

| TIME [ms] | ACCELERATOR OPENING [%] | VEHICLE SPEED [km/h] | ENGINE SPEED [rpm] | ... |
|---|---|---|---|---|
| -10000 | 0 | 30 | 2350 | ... |
| -9500 | 0 | 25 | 1850 | ... |
| ⋮ | ⋮ | ⋮ | ⋮ | ⋮ |
| 0 | 50 | 20 | 1500 | ... |
| ⋮ | ⋮ | ⋮ | ⋮ | ⋮ |
| +9500 | 50 | 40 | 2950 | ... |
| +10000 | 20 | 42 | 3000 | ... |

FIG. 14

| SUBSEQUENT CHANGE ID | CUMULATIVE NUMBER OF TIMES OF STARTUP | TIME STAMP (s) |
|---|---|---|
| A001 | 246 | 1125 |
| A003 | 246 | 1145 |
| A001 | 247 | 150 |
| ⋮ | ⋮ | ⋮ |

FIG. 15

| REGION | STATUS DATA | SUBSEQUENT CHANGE DATA | | | |
|---|---|---|---|---|---|
| | | 1 | 2 | 3 | ... |
| 1 | ID=3 | ID=A001<br>TRIP=246<br>TIME STAMP=1125 | ID=A003<br>TRIP=246<br>TIME STAMP=1145 | ID=A001<br>TRIP=247<br>TIME STAMP=150 | ... |
| 2 | ID=2 | ... | ... | ... | ... |
| 3 | ID=1 | ... | ... | ... | ... |
| 4 | ... | ... | ... | ... | ... |

FIG. 19

| SUBSEQUENT CHANGE ID |
|---|
| A001 |
| A003 |
| A001 |
| ⋮ |

FIG. 20

| REGION | STATUS DATA | SUBSEQUENT CHANGE DATA | | | |
|---|---|---|---|---|---|
| | | 1 | 2 | 3 | ... |
| 1 | ID=3 | ID=A001 | ID=A003 | ID=A001 | ... |
| 2 | ID=2 | ... | ... | ... | ... |
| 3 | ID=1 | ... | ... | ... | ... |
| 4 | ... | ... | ... | ... | ... |

IN-VEHICLE CONTROL DEVICE AND IN-VEHICLE RECORDING SYSTEM

INCORPORATION BY REFERENCE

The present application is a continuation application of U.S. application Ser. No. 15/348,317 filed on Nov. 10, 2016, claiming priority to Japanese Patent Application No. 2015-228007 filed on Nov. 20, 2015. The disclosures of each of these prior applications, including the specification, drawings and abstract, are incorporated herein by reference in their entirety.

BACKGROUND

1. Technical Field

The present disclosure relates to an in-vehicle control device and an in-vehicle recording system.

2. Description of the Related Art

There is a driving assist device that collects surrounding information on an own vehicle by an in-vehicle sensor, determines a danger degree at the time of traveling based on the collected information corresponding to actual road conditions, and controls the vehicle based on the determined danger degree (see, for example, Japanese Patent Application Publication No. 2014-211756).

In some cases, control on the vehicle by the driving assist device may cause a behavior that is unexpected or unforeseen for a driver or a passenger (hereinafter, an occupant). One of the factors that can cause such a situation is a difficulty in taking preference or way of thinking of all the occupants into consideration in development of the driving assist device.

When the behavior that is unexpected or unforeseen for an occupant is caused by control on the vehicle by the driving assist device, the occupant may distrust the control by the driving assist device.

However, the driving assist device in the related art was unable to acquire the data indicating what kind of operation the occupant performed or the data indicating how the state of the occupant was changed as a result of occurrence of an event such as a control on the vehicle by the driving-assist.

The driving assist device in the related art was also unable to acquire the data indicating what kind of operation the occupant performed or the data indicating how the state of the occupant was changed when an event of the level not triggering the driving assist (such as a quick brake and a steep turn) occurred.

Such circumstances might deprive developers and designers of an opportunity to design a system that performs vehicle control without interfering with an intention of operation by the occupant.

SUMMARY

Accordingly, the present disclosure provides an in-vehicle control device and an in-vehicle recording system capable of acquiring the data representing an operation performed by an occupant or the data representing a change in state occurring in the occupant after occurrence of an event in a vehicle.

An in-vehicle control device in a first aspect of the present disclosure includes: a recording unit that sequentially records first data transferred through a local network mounted in a vehicle, the first data representing a status of the vehicle or a status of an occupant of the vehicle; a data acquisition unit that acquires second data relating to a specified event when the specified event occurs in the vehicle, the second data being acquired from a portion of the first data generated within a first time before occurrence of the specified event among the first data recorded on the recording unit and from another portion of the first data recorded on the recording unit within a second time after occurrence of the specified event; a generation unit that generates third data representing occurrence of a specified operation or occurrence of a specified change in state of the occupant when it is determined, based on the first data transferred through the local network, that the specified operation or the specified change in state of the occupant occurs by elapse of a third time that is longer than the second time after occurrence of the specified event; a first holding unit that holds the second data acquired by the data acquisition unit; a second holding unit that holds the third data generated by the generation unit; a nonvolatile memory having a first recording region with a storage capacity equal to or above a data capacity of the first holding unit and a second recording region with a storage capacity equal to or above a data capacity of the second holding unit; a first data control unit that records on the first recording region the second data held in the first holding unit; and a second data control unit that records on the second recording region the third data held in the second holding unit.

According to the in-vehicle control device of the first aspect, the second data relating to the specified event corresponding to a portion of the first data generated within the first time before occurrence of the specified event, and the second data relating to the specified event corresponding to another portion of the first data recorded on the recording unit within the second time after occurrence of the specified event are recorded on the first recording region of the nonvolatile memory.

The third data is also recorded on the first recording region of the nonvolatile memory, the third data representing the specified operation or the specified change in state of the occupant occurring within the third time after occurrence of the specified event.

That is, the second data relating to the specified event before and after occurrence of the specified event and the third data representing the occurrence of the specified operation or the specified change in state of the occupant occurring by the third time after occurrence of the specified event are recorded on the nonvolatile memory.

The second data before and after occurrence of the specified event, which is a portion of the first data relating to the specified event, is the data representing the status of the vehicle, such as vehicle speed and accelerator opening, before and after occurrence of the specified event.

The third data generated by elapse of the third time after occurrence of the specified event is the data representing an operation or the like performed by the occupant after occurrence of the specified event.

Accordingly, according to the in-vehicle control device of the first aspect, the data representing the status of the vehicle, such as the vehicle speed and the accelerator opening, before and after occurrence of the specified event and the data representing an operation or the like performed by the occupant after occurrence of the specified event may be recorded on the nonvolatile memory.

An in-vehicle recording system of the first aspect includes: the local network; a first in-vehicle control device that outputs first data to the local network; and a second in-vehicle control device connected to the first in-vehicle control device through the local network. The in-vehicle control device of the first aspect is used as the second in-vehicle control device.

Therefore, the first aspect can provide the in-vehicle control device and the in-vehicle recording system capable of acquiring the data representing an operation performed by an occupant after occurrence of an event in the vehicle or the data representing a change in state occurring in the occupant.

When the second data and the third data that are recorded on the nonvolatile memory are read out from the in-vehicle control device or the in-vehicle recording system, a reaction of the occupant to the specified event can be verified based on the second data before and after occurrence of the specified event and the third data after occurrence of the specified event.

In the above aspect, the data acquisition unit may acquire first time data representing time of occurrence of the specified event when the specified event occurs in the vehicle, the first holding unit may hold the second data and the first time data acquired by the data acquisition unit, the first data control unit may record on the first recording region the second data and the first time data held in the first holding unit, the generation unit may acquire second time data representing time of occurrence of the specified operation or the specified change in state of the occupant from the local network, and may associate the second time data with the third data, the second holding unit may hold the third data associated with the second time data, and the second data control unit may record on the second recording region the third data held by the second holding unit and associated with the second time data.

According to the above aspect, the second data and the first time data are recorded on the first recording region, and the third data associated with the second time data is recorded on the second recording region. The first time data is data representing time of occurrence of the specified event. The second time data is data representing time of occurrence of the specified operation or the specified change in state of the occupant.

Accordingly, in the above aspect, after the second data recorded on the first recording region and the third data recorded on the second recording region are read out from the in-vehicle control device, the second data and the third data can be associated with each other using the first time data and the second time data.

In the above aspect, the first time data and the second time data may be data representing time identified by elapsed time after startup of the vehicle and by the cumulative number of times of startup of the vehicle, or may be data representing absolute time.

According to the above aspect, the second data and the third data can more easily be associated with each other using the elapsed time and the cumulative number of times of startup of the vehicle, or using the absolute time.

In above aspect, the first time data and the second time data may be data representing time identified by elapsed time after startup of the vehicle and by the cumulative number of times of startup of the vehicle, the second data control unit may record a portion of the third data among the third data associated with the second time data held by the second holding unit on the second recording region in association with the second data recorded on the first recording region, the portion of the third data having a difference between the elapsed time from the first time data and the elapsed time from the second time data being equal to or below the third time and a difference between the cumulative number of times of startup at the first time data and the cumulative number of times of startup at the second time data being equal to or below a specified number of times.

Since the third data, which satisfies a specified condition considered to be highly related to the second data recorded on the first recording region, is recorded on the second recording region, (a difference between the elapsed time from the first time data and the elapsed time from the second time data is equal to or below the third time and a difference between the cumulative number of times of startup at the first time data and the cumulative number of times of startup at the second time data is equal to or below a specified number of times), it becomes easy to associate the second data recorded on the first recording region with the third data recorded on the second recording region.

In the above aspect, the data acquisition unit may acquire time data representing time of occurrence of the specified event when the specified event occurs in the vehicle, the first holding unit may hold the second data and the time data acquired by the data acquisition unit, the first data control unit records on the first recording region the second data and the time data held in the first holding unit, and the second data control unit may record on the second recording region the third data held in the second holding unit in association with the second data recorded on the first recording region.

According to the above aspect, the third data is recorded on the second recording region in association with the second data recorded on the first recording region and the time data representing time of occurrence of the specified event. Since it is not necessary to associate the third data held in the second holding unit with the time data, a load of the second recording region can be reduced.

In the above aspect, the nonvolatile memory includes a first nonvolatile memory having the first recording region and a second nonvolatile memory having the second recording region.

Since the third data recorded on the second recording region is smaller in data capacity than the first data recorded on the first recording region, an inexpensive memory with a small data capacity can be used as the second nonvolatile memory.

An in-vehicle recording system in a second aspect of the present disclosure includes: a local network mounted in a vehicle; a first in-vehicle control device connected to the local network to output first data representing a status of the vehicle or a status of an occupant of the vehicle to the local network; and a second in-vehicle control device connected to the first in-vehicle control device through the local network. The first in-vehicle control device has: a determination unit that determines whether or not a specified event occurs in the vehicle; and a trigger state setting unit that outputs a trigger signal indicating occurrence of the specified event to the local network when the determination unit determines that the specified event occurs, and the second in-vehicle control device has: a recording unit that sequentially records the first data transferred through the local network; a data acquisition unit that acquires second data relating to the specified event upon reception of the trigger signal through the local network, the second data being acquired from a portion of the first data generated within a first time before occurrence of the specified event among the first data recorded on the recording unit and from another portion of the first data recorded on the recording unit within a second time after occurrence of the specified event; a generation unit that generates third data representing occurrence of a specified operation or occurrence of a specified change in state of the occupant, when it is determined, based on the first data transferred through the local network, that the specified operation or the specified change in state of the occupant occurs by elapse of a third time that is longer than the second time after occurrence of the specified event; a first holding unit that holds the second data acquired by the data acquisition unit; a second holding unit that holds the third data generated by the generation unit; a nonvolatile memory having a first recording region with a storage capacity equal to or above a data capacity of the first holding unit and second recording region with a storage capacity equal to or above a data capacity of the second holding unit; a first data control unit that records on the first recording region the second data held in the first holding unit; and a second data control unit that records on the second recording region the third data held in the second holding unit.

It becomes possible to provide the in-vehicle control device and the in-vehicle recording system capable of acquiring the data representing an operation performed by an occupant after occurrence of an event in a vehicle or the data representing a change in state occurring in the occupant.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 10 illustrates the data structure of an event database;

FIG. 11 illustrates the data structure of an associated database including status data and event IDs associated with each other;

FIG. 12 illustrates the data structure of a subsequent change database representing subsequent change phenomena;

FIG. 13 illustrates one example of data such as status data recorded on a first recording region of a data recording unit;

FIG. 14 illustrates one example of a subsequent change ID, cumulative number of times of startup data, and time stamp data recorded on a second recording region of the data recording unit;

FIG. 15 illustrates data recorded on the first recording region and the second recording region of the data recording unit;

FIG. 19 illustrates data recorded on the second recording region of the data recording unit in an in-vehicle control device and an in-vehicle recording system in a third embodiment; and FIG. 20 illustrates data recorded on the data recording unit by the data recording ECU in the third embodiment.

DETAILED DESCRIPTION OF EMBODIMENTS

Hereinafter, embodiments to which the in-vehicle control device and the in-vehicle recording system of the present disclosure are applied will be described.

First Embodiment

Figure 1:
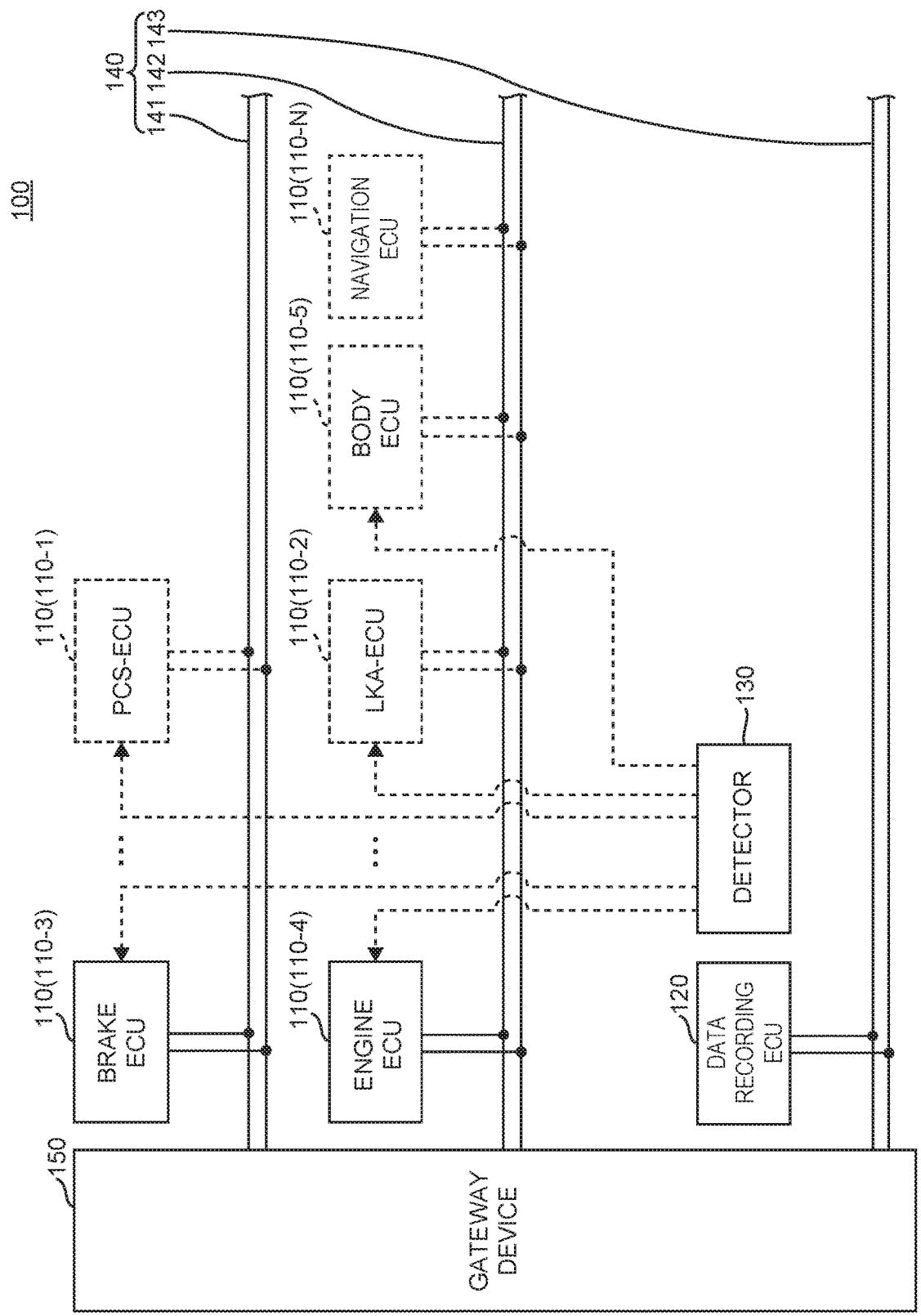
FIG. 1 illustrates one example of the configuration of an in-vehicle recording system 100 in a first embodiment.

FIG. 1 illustrates one example of the configuration of the in-vehicle recording system 100 in the first embodiment.

The in-vehicle recording system 100 includes ECUs 110 (a pre-crash safety (PCS)-electronic control unit (ECU) 110-1, a lane keeping assist (LKA)-ECU 110-2, a brake ECU 110-3, an engine ECU 110-4, a body ECU 110-5 . . . and a navigation ECU 110-N), a data recording ECU 120, a detector 130, a controller area network (CAN) 140, and a gateway device 150.

The in-vehicle recording system 100, which is mounted in a vehicle, records status data prescribed for each type of the event, when the event of any prescribed type is detected. Hereinafter, a term "vehicle" refers to the vehicle that incorporates the in-vehicle recording system 100 unless otherwise specified.

A term "event" refers to, for example, the phenomenon that occurs in a vehicle that is controlled based on such parameters as control values calculated for vehicle control or control signals generated in response to an operation performed by an occupant (a driver or a passenger) of the vehicle. The types of the event are prescribed for analysis purposes and the like. Examples of the event include actuation of a specific driving assist function that is executed when a specific condition is satisfied. Examples of the driving assist function include an alarm control function and an intervention control function.

The alarm control function includes a pre-collision alert or pre-crash safety alert (hereinafter referred to as "PCS alert") for avoiding collision with an obstacle in front of the vehicle, a lane departure alert (LDA), and a cross traffic alert (CTA). The intervention control function, which is a control function executed regardless of the operation by the driver, includes an automatic brake (hereinafter referred to as "PCS brake") for avoiding collision with an obstacle in front of the vehicle, vehicle stability control (VSC), an anti-lock brake system (ABS), traction control (TRC), and lane keeping assist (LKA).

The examples of the event also include, in addition to actuation of the driving assist function described above, events executed by the vehicle based on specific operations. Examples of the event generated by specific operations include simultaneous generation of an accelerator signal (accelerator opening larger than zero) and a brake signal (the operation amount of a brake pedal larger than zero), accelerator opening reaching a middle level or more when a shift position is in a neutral (N) range, a quick brake (a brake strong enough to trigger actuation of ABS in rainy weather), an emergency brake (a brake more urgent than a quick brake), and steep turn (turn-traveling that generates lateral acceleration of a specified value or more).

The examples of the event also include detection of collision between the vehicle and another object.

The status data represents a status of a vehicle or a status of an occupant of the vehicle. The status data is one example of the first data.

The status of the vehicle refers to a vehicle driving status (such as acceleration and speed based on sensor values or computed values), a vehicle control status (such as a control operation command and a control command value), a vehicle traveling status (such as distance to a leading vehicle and a travel lane based on the sensor values or the computed values), a vehicle operation status (such as the accelerator opening and the brake operation amount based on the sensor values), a vehicle attribute (such as a hybrid vehicle (HV), an electric vehicle (EV) and a diesel vehicle), and a vehicle environment status (such as indoor temperature, outdoor temperature, and presence of raindrops based on the sensor values).

The status of an occupant of the vehicle refers to the state of an occupant (a driver and a passenger) of the vehicle. The state of the occupant of the vehicle is, for example, the state representing whether or not the driver looks away, which is detected based on an image of the driver acquired with a camera disposed in a vehicle cabin, or a heart rate of the driver detected with a heart rate detection electrode disposed in the vehicle cabin.

Specific examples of the status data representing the status of the vehicle or the status of the occupant as described above are as follows.

Examples of the status data representing the status of the vehicle includes the accelerator opening ratio, the engine speed, a shift position signal (signal indicating a shift lever position), brake oil pressure (data representing hydraulic pressure inside a master cylinder), an HV identification flag (flag indicating whether the vehicle is a hybrid vehicle or not), a fuel injection amount command value, a VSC off-lamp (data representing the state of a VSC off-lamp), and an engine load factor (data representing a load applied to an engine).

Examples of the status data representing the status of the vehicle further include ABS control (data representing the presence of ABS control actuation), VSC control (data representing the presence of VSC control actuation), TRC control (data representing the presence of TRC control actuation), control-target inter-vehicle distance, control-target relative speed, an LKA/LDA control state, and an electric power steering (EPS) torque sensor value.

The status data includes not only the data described before but also pickup images, various control command values, flag establishment histories in various control, diagnosis (self-diagnosis) information, and voltage values of in-vehicle batteries. The status data is generated by digital-converting the signals, which are detected with sensors and the like, in ECU 110.

The types of the status data recorded on the data recording ECU 120 are prescribed for each event type. This is because the status data type useful for analysis may be different depending on the types of the event. Two or more types of status data may be recorded for one event.

The ECUs 110 (the PCS-ECU 110-1, the LKA-ECU 110-2, the brake ECU 110-3, the engine ECU 110-4, the body ECU 110-5, . . . , and the navigation ECU 110-N), the data recording ECU 120, and the detector 130 are connected to CAN buses 141, 142, and 143 of a CAN 140. The CAN buses 141, 142, and 143 are connected through a gateway device 150.

The number of the ECUs 110 is N. In FIG. 1, the PCS-ECU 110-1, the LKA-ECU 110-2, the brake ECU 110-3, the engine ECU 110-4, the body ECU 110-5, . . . , and the navigation ECU 110-N are illustrated as examples of the ECUs 110.

In FIG. 1, out of N ECUs 110, the PCS-ECU 110-1, the LKA-ECU 110-2, the brake ECU 110-3, the engine ECU 110-4, the body ECU 110-5, . . . , and the navigation ECU 110-N are illustrated, and therefore N is an integer greater than or equal to 6.

The ECUs 110, which are control devices that execute control on the vehicle, are ECUs that execute control relating to events of prescribed types, among the ECUs mounted on the vehicle. Each ECU 110 executes control relating to one or more types of events. The ECUs 110 are ECUs that execute control relating to events, such as actuation of the driving assist function.

The PCS-ECU 110-1 issues an alert (PCS alert) for avoiding collision with an obstacle in front of the vehicle based on a parameter such as the vehicle speed detected by the detector 130 and the distance between the vehicle and the obstacle in front of the vehicle, and performs control to actuate an automatic brake (hereinafter referred to as PCS brake) for avoiding collision with an obstacle.

The LKA-ECU 110-2 is an ECU that controls a rudder angle to keep the vehicle within a traveling lane based on information such as images in front of the vehicle detected by the detector 130 and the like.

The brake ECU 110-3 is an ECU that executes control to implement an anti-lock brake system (ABS) function and a vehicle stability control (VSC) function based on parameters such as hydraulic pressure inside the master cylinder detected by the detector 130. The brake ECU 110-3 cooperates with the PCS-ECU 110-1 to control the PCS brake.

The engine ECU 110-4 is an ECU that controls engine output based on parameters such as the accelerator opening and the vehicle speed detected by the detector 130. The engine ECU 110-4 executes control to implement a traction control (TRC) function.

In the case of the hybrid vehicle and the EV vehicle, an HV-ECU and an EV-ECU may be used in place of the engine ECU 110-4, respectively. The HV-ECU is an ECU that controls output of an engine or a driving motor based on parameters such as the accelerator opening and the vehicle speed detected by the detector 130. The EV-ECU is an ECU that controls output of the driving motor based on parameters such as the accelerator opening and the vehicle speed detected by the detector 130.

The body ECU 110-5 is an ECU that performs comprehensive control on the vehicle. The body ECU 110-5 outputs data representing the cumulative number of times of startup and the time stamp to the CAN 140.

The cumulative number of times of startup is the total cumulative number of times of turning-on an ignition of the vehicle (IG-ON) after the body ECU 110-5 is mounted on the vehicle. The time stamp represents the time elapsed from startup of the vehicle (elapsed time). For example, the cumulative number of times of startup and the time stamp are counted by the body ECU 110-5.

The cumulative number of times of startup and the time stamp construct time data that represents the time when an action such as control on the vehicle is performed. Since the cumulative number of times of startup is the total cumulative number of times of turning on the ignition of the vehicle (IG-ON), the time when the vehicle was started can be narrowed into a certain range by identifying the cumulative number of times of startup. Since the time stamp represents the elapsed time after startup of the vehicle, using the time stamp together with the cumulative number of times of startup makes it possible to identify the time when an action such as control on the vehicle was performed.

The navigation ECU 110-N is an ECU that controls navigation based on information such as position information detected by the detector 130. A global positioning system (GPS) antenna included in the detector 130 acquires position information and time information from a GPS signal. Accordingly, the navigation ECU 110-N acquires the position information and the time information from the GPS antenna included in the detector 130.

Note that the PCS-ECU 110-1, the LKA-ECU 110-2, the brake ECU 110-3, the engine ECU 110-4, the body ECU 110-5, . . . , and the navigation ECU 110-N are simply referred to as the ECUs 110 unless otherwise distinguished from each other. Each of the ECUs 110 is one example of the first in-vehicle control device.

The data recording ECU 120 sequentially records the status data transferred through the CAN 140 and the gateway device 150. When an event occurs, the data recording ECU 120 records on a nonvolatile memory the status data relating to the event that occurs, among the status data over predetermined time before and after occurrence of the event. The data recording ECU 120 is one example of the second in-vehicle control device and the in-vehicle control device. The status data relating to the event that occurs, among the status data over the predetermined time before and after occurrence of the event, is one example of the second data.

When a subsequent change, which is a specified operation or a specified change in state of an occupant, occurs within predetermined time after occurrence of the event, the data recording ECU 120 generates subsequent change data representing the subsequent change that occurs, and records the subsequent change data on the nonvolatile memory. The subsequent change data is one example of the third data. The subsequent change is a specified operation or a specified change in state of an occupant. The subsequent change will be described later.

When the data recorded on the data recording ECU 120 is read out, the data recording ECU 120 is connected to a dedicated personal computer (PC), and the data recorded on the data recording ECU 120 is read out with the PC. For example, when the vehicle is put in a facility such as a repair factory for such purposes as inspection, operation of reading out the data recorded on the data recording ECU 120 can be performed.

In one example, the data recording ECU 120 is provided in a lower portion of a center console in the vehicle cabin. When the data recording ECU 120 is disposed in the place highest strength in the vehicle, the data recorded on the data recording ECU 120 can be read out even in the case where the vehicle is damaged by collision with another vehicle, an obstacle, or the like. A description is given of the data recording ECU 120 that is configured as part of an airbag ECU that controls deployment of an airbag as one example. The data recording ECU 120 may be configured so as to be separated from the airbag ECU from an aspect of a circuit but be physically integrated with the airbag ECU.

The detector 130 collectively represents sensors that detect the status of the vehicle, including the vehicle speed, the accelerator opening, the engine speed, the brake oil pressure, and the rudder angle of the vehicle. Signals indicating parameters such as the vehicle speed, the accelerator opening, the engine speed, the brake oil pressure, and the rudder angle, which are detected by the detector 130, are input into the ECU 110 through signal lines illustrated with a broken line.

The detector 130 may also include sensors that detect the status of an occupant of the vehicle, the sensors including a camera that acquires a facial image of the driver, a microphone that collects voice in the vehicle, and an electrode that detects the heart rate of the driver, for example.

Among the signals indicating parameters such as the vehicle speed detected by the detector 130, necessary signals are input into each of the ECUs 110. The signals indicating parameters such as the vehicle speed detected by the detector 130 are converted into digital data by the ECUs 110, and are output to the CAN 140.

Part of the detector 130 is directly connected to the ECUs 110 or the data recording ECU 120, and signals detected by part of the detector 130 may be converted into digital data within the ECUs 110 or the data recording ECU 120.

Here, since the data recording ECU 120 is part of the airbag ECU, a G sensor included in the detector 130 is directly connected to the airbag ECU. A signal indicating G (acceleration) detected by the G sensor included in the detector 130 may be converted into digital data by the airbag ECU, and be used within the airbag ECU and the data recording ECU 120, while being transmitted from the airbag ECU to the ECUs 110 which require an acceleration signal, among each of the ECUs 110, through the CAN 140.

The CAN 140 has the CAN buses 141, 142, and 143. The CAN buses 141 to 143 are connected to each other through the gateway device 150. The CAN bus 141 or the CAN bus 142 is connected to the ECUs 110, while the CAN bus 143 is connected to the data recording ECU 120. The CAN 140 works in cooperation with the gateway device 150 to construct an in-vehicle network that allows mutual communication between the ECUs 110 and the data recording ECU 120 based on a CAN protocol. The form of connection between the data recording ECU 120 and the ECUs 110 illustrated in FIG. 1 is merely an example.

The gateway device 150 is one example of a gateway device that relays a flag to the CAN bus 143, the flag representing the state of establishment of a trigger output from the ECUs 110 to the CAN buses 141 and 142. In the following description, the flag representing the state of establishment of the trigger is referred to as a trigger establishment flag. The state of establishment of the trigger and the trigger establishment flag will be described later.

Figure 2:
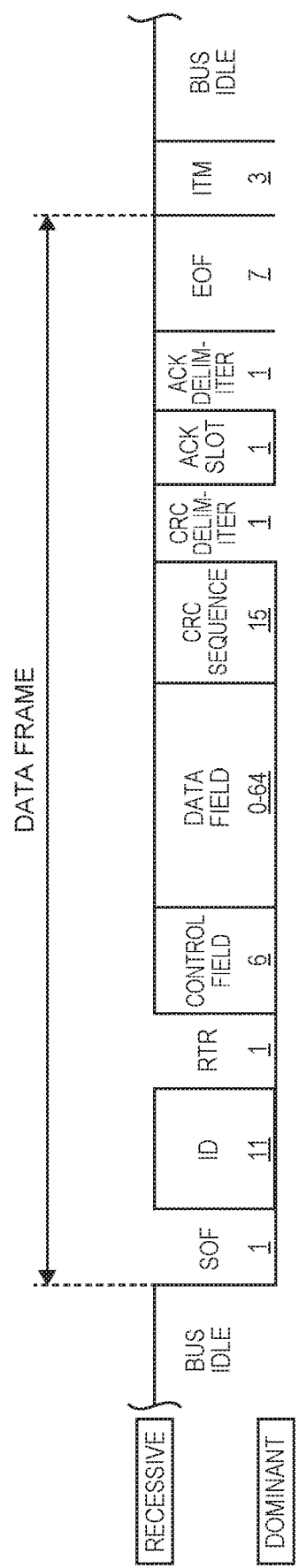
FIG. 2 illustrates one example of a CAN frame in a CAN protocol standard format.

FIG. 2 illustrates one example of the CAN frame in a CAN protocol standard format.

The CAN frame (data frame) in the CAN protocol standard format has a 1-bit start of frame (SOF), an 11-bit identifier (ID), a 1-bit remote transmission request (RTR), a 6-bit control field, a 0 to 64-bit data field, a 15-bit CRC sequence, a 1-bit CRC delimiter, a 1-bit ACK slot, a 1-bit ACK delimiter, and a 7-bit end of frame (EOF).

The data transmitted through the CAN frame is contained in the data field. The CAN frame can transmit up to 8-byte data in units of one byte. The length of the data contained in the CAN frame is set in the range of zero to eight by a 4-bit data length code (DLC) included in the control field.

The data field in the CAN frame contains the status data, the trigger establishment flag, and the data representing the cumulative number of times of startup and the time stamp. The status data, the trigger establishment flag, and the data representing the cumulative number of times of startup and the time stamp are written in the data field of the CAN frame and are transferred through the CAN 140.

The identifier (ID), which is used for identifying a data content, a transmission node, and the like, has a function of determining the priority of communication arbitration in the CAN 140 (arbitration in the case where CAN frames are concurrently output from a plurality of nodes to the CAN buses 141 to 143). The priority is higher as the ID is smaller. Since the ID has an 11-bit length in the range of 0x00 to 0x7FF (hexadecimal), it becomes possible to allocate IDs that can identify up to 2,048 data sets.

A CAN frame (not illustrated) in a CAN protocol extended format includes not only an 11-bit base ID corresponding to the ID in the standard format but also an 18-bit extended ID. Accordingly, the ID including the base ID and the extended ID has a length of 29 bits in the range of 0x00 to 0x1FFFFFFF (hexadecimal). Accordingly, it becomes possible to allocate the IDs that can identify up to about 540,000,000 data sets.

The ECUs 110 and the data recording ECU 120 transmit and receive the CAN frames in the CAN 140 in accordance with the ID allocated in advance. Accordingly, the ECUs 110 and the data recording ECU 120 can identify the CAN frames on the CAN 140 (CAN buses 141, 142, and 143) so as to receive necessary data. Hereinafter, the ID in the standard format, and the base ID and extended ID in the extended format are collectively referred to as "CAN-ID."

A description is now given of the hardware configuration of the ECU 110 and the data recording ECU 120.

Figure 3:
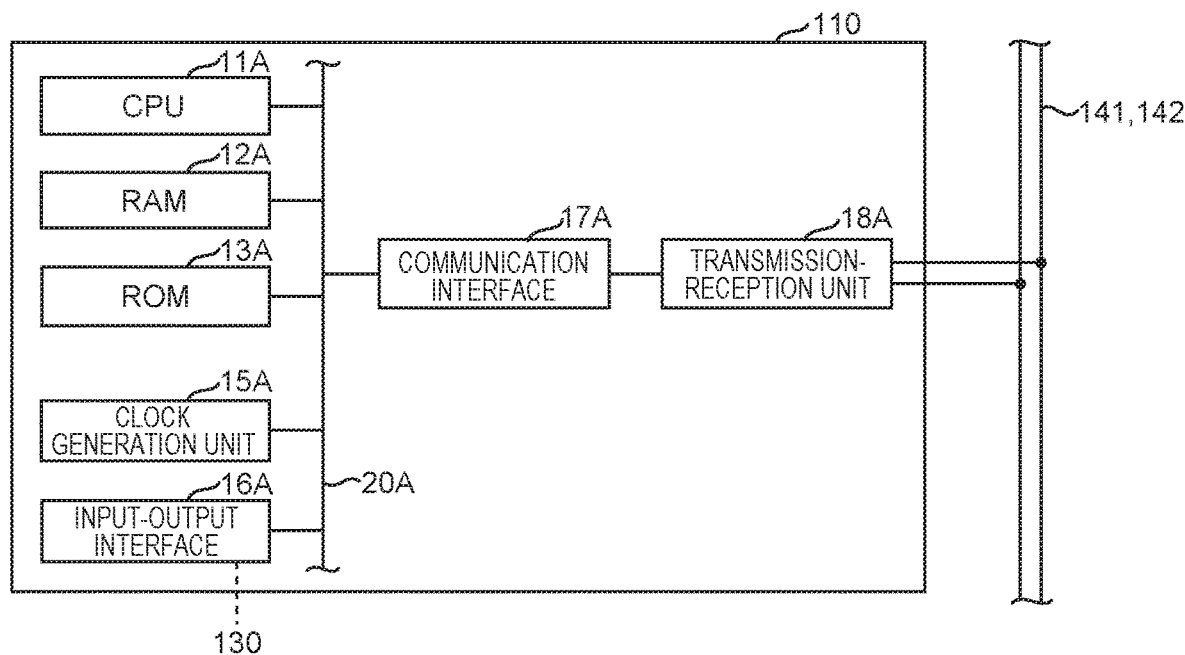
FIG. 3 illustrates one example of a hardware configuration of an ECU.

FIG. 3 illustrates one example of the hardware configuration of the ECU 110.

The ECUs 110 include a central processing unit (CPU) 11A, a random access memory (RAM) 12A, a read only memory (ROM) 13A, a clock generation unit 15A, an input-output interface 16A, a communication interface 17A, a transmission-reception unit 18A, and an internal bus 20A.

The CPU 11A, the RAM 12A, the ROM 13A, the clock generation unit 15A, the input-output interface 16A, and the communication interface 17A are communicably connected to each other through the internal bus 20A.

The CPU 11A executes programs stored in the ROM 13A. As a result, the functions as the ECUs 110 are implemented.

The RAM 12A is used to expand the programs executed by the CPU 11A, and is also used to temporarily hold data such as the data utilized when the CPU 11A executes the programs.

The ROM 13A stores the programs executed by the CPU 11A and the data necessary for implementing the functions as the ECUs 110.

The clock generation unit 15A, which includes a crystal resonator, generates and outputs a control clock of the CPU 11A.

The input-output interface 16A is an interface that connects the internal bus 20A and the detector 130.

The input-output interface 16A is connected to the detector 130 to receive signals indicative of the information detected by devices such as sensors included in the detector 130. The information input from the detector 130 through the input-output interface 16A is digital-converted into status data in the CPU 11A.

The status data is utilized inside the CPU 11A or is output to the CAN bus 141 or 142 through the communication interface 17A and the transmission-reception unit 18A. The status data output to the CAN bus 141 or 142 is transmitted to some ECUs 110 that require the status data, among the plurality of ECUs 110.

The communication interface 17A is an interface that connects the transmission-reception unit 18A and the internal bus 20A.

The transmission-reception unit 18A, which includes a CAN transceiver and a CAN driver, is connected to the CAN bus 141 or 142. The ECUs 110 are connected to the CAN bus 141 or 142 by the transmission-reception unit 18A, and are connected to each other through the CAN bus 141 or 142.

Figure 4:
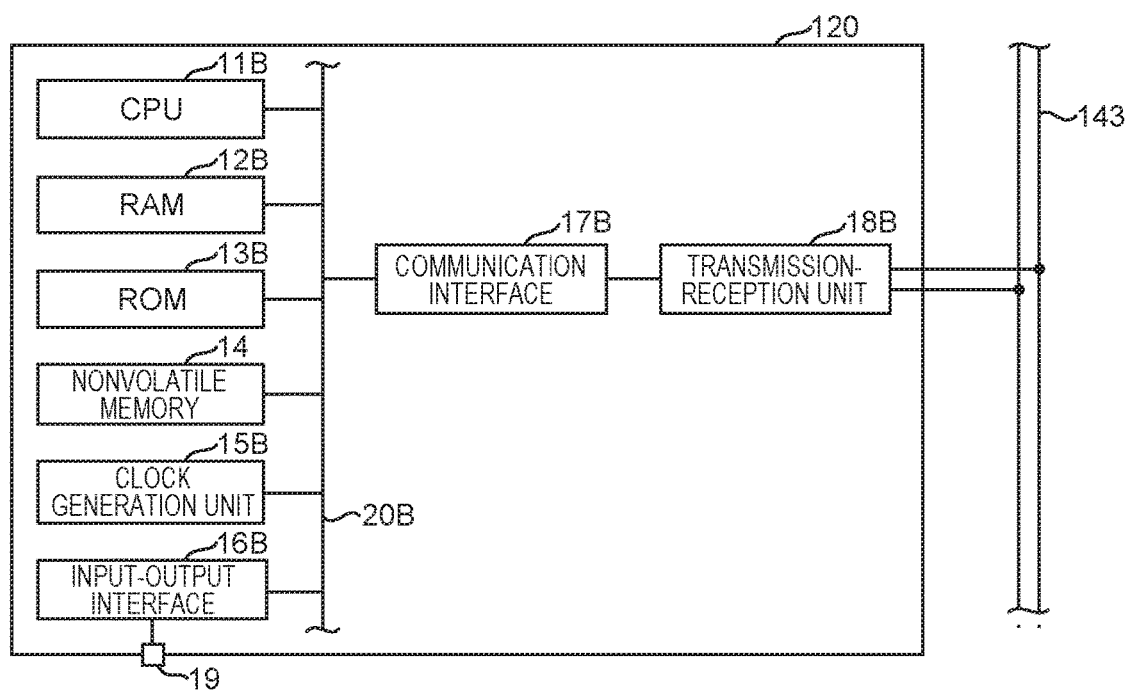
FIG. 4 illustrates one example of a hardware configuration of a data recording ECU 120.

FIG. 4 illustrates one example of the hardware configuration of the data recording ECU 120.

The data recording ECU 120 includes a CPU 11B, a RAM 12B, ROM 13B, a nonvolatile memory 14, a clock generation unit 15B, an input-output interface 16B, a communication interface 17B, a transmission-reception unit 18B, a terminal 19, and an internal bus 20B.

The CPU 11B, the RAM 12B, ROM 13B, the clock generation unit 15B, the input-output interface 16B, the communication interface 17B, the transmission-reception unit 18B, and the internal bus 20B in the data recording ECU 120 are similar to the CPU 11A, the RAM 12A, the ROM 13A, the clock generation unit 15A, the input-output interface 16A, the communication interface 17A, the transmission-reception unit 18A, and the internal bus 20A in the ECU 110 illustrated in FIG. 3, respectively.

The data recording ECU 120 is similar in hardware configuration to the ECU 110 illustrated in FIG. 3 except for the additionally provided nonvolatile memory 14 and terminal 19.

The CPU 11B, the RAM 12B, the ROM 13B, the nonvolatile memory 14, the clock generation unit 15B, the input-output interface 16B, and the communication interface 17B are communicably connected to each other through the internal bus 20B.

The CPU 11B executes the programs stored in the ROM 13B. As a result, the function as the data recording ECU 120 is implemented.

The RAM 12B is used to expand the programs executed by the CPU 11B, and is also used to temporarily hold data such as the data utilized when the CPU 11B executes the programs. Part of the RAM 11 is utilized as a ring buffer of the data recording ECU 120.

The ROM 13B stores the programs executed by the CPU 11B and the data necessary for implementing the function as the data recording ECU 120.

For example, the nonvolatile memory 14 is a memory such as an electrically erasable programmable read only memory (EEPROM). From a viewpoint of a mount space and cost, a memory with a relatively low capacity in the range of, for example, about several tens KB to several hundreds KB is adopted as the nonvolatile memory 14.

The nonvolatile memory 14 holds the status data recorded by the data recording ECU 120 when a specified event occurs, and also records the subsequent change data representing a subsequent change (a specified operation or a specified change in state of an occupant) that occurs by the elapse of a predetermined time (third time) after occurrence of the event.

The nonvolatile memory 14 also stores data such as the data utilized when the data recording ECU 120 collects the status data and the subsequent change data to be registered into the nonvolatile memory 14.

The clock generation unit 15B, which includes a crystal resonator, generates and outputs a control clock of the CPU 11B.

The input-output interface 16B is an interface that connects the internal bus 20B and the terminal 19.

The communication interface 17B is an interface that connects the transmission-reception unit 18B and the internal bus 20B.

The transmission-reception unit 18B, which includes a CAN transceiver and a CAN driver, is connected to the CAN bus 143. The data recording ECU 120 is connected to the CAN bus 143 by the transmission-reception unit 18B, and is connected to the ECUs 110 through the CAN bus 143.

The terminal 19 is used to read out the status data and the subsequent change data representing a subsequent change (a specified operation or a specified change in state of an occupant) which are recorded on the nonvolatile memory 14. The terminal 19 is connected to a dedicated PC to read out the data recorded on the nonvolatile memory 14. For example, when the vehicle is put in a facility such as the repair factory for such purposes as inspection, operation of reading out the data recorded on the nonvolatile memory 14 can be performed.

Figure 5:
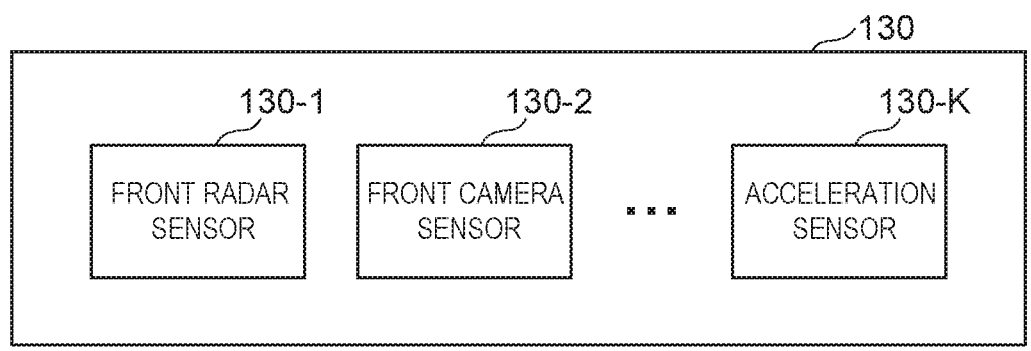
FIG. 5 illustrates one example of the configuration of a detector.

FIG. 5 illustrates one example of the configuration of the detector 130.

The detector 130 collectively represents sensors that detect parameters such as the vehicle speed, the accelerator opening, the engine speed, the brake oil pressure, and the rudder angle of the vehicle. The detector 130 is communicably connected with the ECUs 110 and the data recording ECU 120 through the CAN 140.

In FIG. 5, the detector 130 includes a front radar sensor 130-1, a front camera sensor 130-2, . . . , and an acceleration sensor 130-K as one example.

Signals indicating parameters such as the vehicle speed, the accelerator opening, the engine speed, the brake oil pressure, and the rudder angle of the vehicle, which are detected by the detector 130, are input into the ECUs 110 that perform digital conversion of the respective signals into the status data.

That ECUs 110, which receive input of the plurality of signals indicating the parameters such as the vehicle speed, the accelerator opening, the engine speed, the brake oil pressure, and the rudder angle of the vehicle, are predetermined, respectively. The status data representing the parameters such as the vehicle speed is generated in the predetermined ECUs 110.

For example, the status data representing the acceleration of the vehicle is generated when any one of the ECUs 110 digital-converts the signal indicating the acceleration detected by the acceleration sensor 130-K.

The status data generated in one of the ECUs 110 based on detection information by the front radar sensor 130-1 and on pickup images by the front camera sensor 130-2 illustrated in FIG. 5 are digital data representing detection information by the front radar sensor 130-1 and the pickup images by the front camera sensor 130-2.

Figure 6:
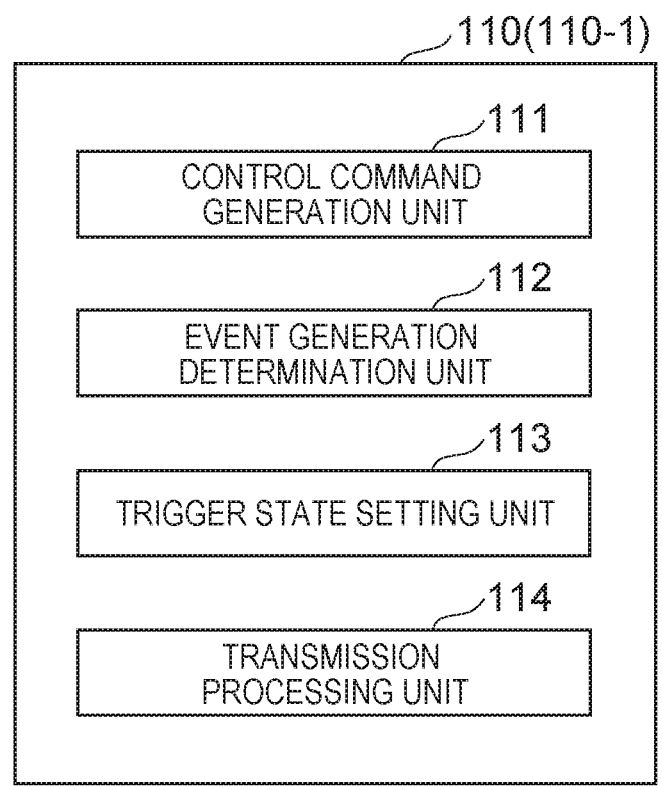
FIG. 6 illustrates a functional configuration of the ECU.

FIG. 6 illustrates a functional configuration of one of the ECUs 110. Here, a description is given of the case where the ECU 110 is a PCS-ECU 110-1 as one example. Accordingly, reference numeral 110 that represents ECU 110 illustrated in FIG. 6 has a reference numeral 110-1 in brackets appended thereto.

FIG. 6 illustrates functional blocks implemented when the CPU 11A (see FIG. 3) executes the programs stored in the ROM 13A (see FIG. 3) of the ECU 110.

The ECU 110 includes a control command generation unit 111, an event generation determination unit 112, a trigger state setting unit 113, and a transmission processing unit 114.

When the ECU 110 performs control relating to two or more types of events (for example, when conducting control relating to a plurality of driving assist functions), the control command generation unit 111, the event generation determination unit 112, and the trigger state setting unit 113 are provided for each event (each driving assist function).

The control command generation unit 111 generates control commands relating to events (for example, control commands relating to actuation of the driving assist functions, control commands relating to actuation of a fail-safe function for the events attributed to specific operations, etc.).

The control command generation unit 111 of the PCS-ECU 110-1 generates control commands relating to "actuation of PCS alert", and "actuation of PCS brake." Specifically, the control command generation unit 111 determines the necessity of actuation of the PCS alert and actuation of the PCS brake based on at least one piece of information obtained from the detector 130.

Specifically, for example, the control command generation unit 111 of the PCS-ECU 110-1 calculates time to collision (TTC) that is a period of time until the vehicle collides with an obstacle in front of the vehicle, based on the detection information from at least one of the front radar sensor 130-1 and the front camera sensor 130-2. When TTC that is the time until collision becomes equal to or below a predetermined threshold value Tth1, the control command generation unit 111 generates an alarm command, and the transmission processing unit 114 transmits the alarm command to the brake ECU 110-3 (see FIG. 1) through the transmission-reception unit 18A (see FIG. 3).

When TTC that is the time until collision is equal to or below a predetermined threshold value Tth2 (<Tth1), the control command generation unit 111 generates an automatic brake command, and the transmission processing unit 114 transmits the command to the brake ECU 110-3 through the transmission-reception unit 18A (see FIG. 3). Upon reception of the alarm command, the brake ECU 110-3 generates a control command, and actuates an alert buzzer (actuates the PCS alert).

Upon reception of the automatic brake command, the brake ECU 110-3 generates a control command (command value), and controls a brake actuator including various valves, a pump, and an accumulator. That is, the brake ECU 110-3 actuates the PCS brake by increasing oil cylinder pressure of each wheel based on a control value that is different from a control value corresponding to the brake operation by the driver.

The event generation determination unit 112 determines whether or not a specified event occurs in the vehicle. For example, the event generation determination unit 112 of the PCS-ECU 110-1 determines whether or not the control command generation unit 111 generates an alarm command that actuates the PCS alert. The event in this case is generation of the alarm command that actuates the PCS alert. The event generation determination unit 112 is one example of the determination unit.

The event generation determination unit 112 of the PCS-ECU 110-1 determines whether or not the control command generation unit 111 generates an automatic brake command that actuates the PCS brake. The event in this case is generation of the automatic brake command that actuates the PCS brake.

The event generation determination unit 112 determines whether or not the specified event occurs in the vehicle as described before and also outputs an event ID representing the type of the event. The event ID is a characteristic identifier allocated to each type of event.

The trigger state setting unit 113 generates a trigger establishment flag that is used to determine whether or not to record status data on the nonvolatile memory 14 in the data recording ECU 120. The status data are data representing the status of the vehicle, or the status of an occupant of the vehicle. The trigger establishment flag is a trigger indicating the presence of occurrence of an event determined by the event generation determination unit 112.

When it is determined that an event occurs, the trigger state setting unit 113 sets a trigger state to an established state, whereas when it is determined that the event does not occur, the trigger state setting unit 113 sets the trigger state to a non-established state. That is, the trigger establishment flag indicates the trigger state (established state or non-established state).

The status data and the trigger establishment flag are written in the data field of the CAN frame, and are carried by the CAN frame.

The trigger state setting unit 113 sets the trigger state, which corresponds to the event determined to occur by the event generation determination unit 112, to the established state. For example, the trigger state setting unit 113 of the PCS-ECU 110-1 sets the trigger state, which corresponds to generation of an alarm command that actuates the PCS alert, to the established state when the event generation determination unit 112 determines that the alarm command that actuates the PCS alert is generated by the control command generation unit 111.

Similarly, the trigger state setting unit 113 of the PCS-ECU 110-1 sets the trigger state, which corresponds to generation of an automatic brake command that actuates the PCS brake, to the established state when the event generation determination unit 112 determines that the automatic brake command that actuates the PCS brake is generated by the control command generation unit 111.

The transmission processing unit 114 transmits the CAN frames that carry each of the trigger establishment flags and the event IDs of a plurality of events to the CAN bus 141 or the CAN bus 142.

For example, the transmission processing unit 114 in the PCS-ECU 110-1 transmits to the CAN bus 141 a CAN frame that conveys the trigger establishment flag indicating the state of the trigger (PCS alert trigger) corresponding to an alarm command that actuates the PCS alert and the event ID of an event that is generation of the alarm command that actuates the PCS alert.

The transmission processing unit 114 in the PCS-ECU 110-1 also transmits to the CAN bus 141 the CAN frame that carries the trigger establishment flag indicating the state of a trigger (automatic brake trigger) corresponding to an automatic brake command that actuates PCS brake and the event ID of an event that is generation of the automatic brake command that actuates the PCS brake.

Figure 7:
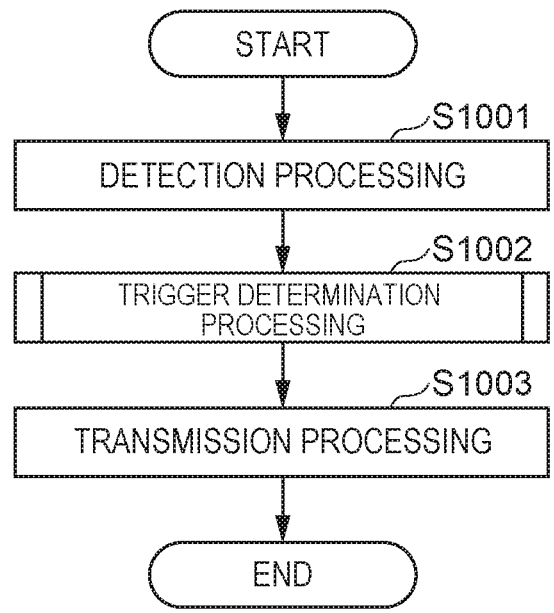
FIG. 7 is a flowchart illustrating one example of a main processing routine executed by the ECU 110.

FIG. 7 is a flowchart illustrating one example of a main processing routine executed by the ECUs 110. The main processing routine illustrated in FIG. 7 is repeatedly executed in each specified period during a period of time from startup of the vehicle to stop of the vehicle. That is, the processing is started (START) concurrently with startup of the vehicle, and is repeatedly executed in each specified period until the vehicle is stopped and the processing is ended (END). After the vehicle is started, processing in steps S1001 to S1003 is repeatedly executed in each specified period until the vehicle is stopped.

Here, the phrase "startup of the vehicle" refers to putting the vehicle in a travelable state where the vehicle can travel in response to an operation by the driver. Examples of the startup of the vehicle include turning on the ignition in engine vehicles (IG-ON), and starting a control device (for example, HV-ECU etc.) that performs coordination control on the entire vehicle in motor vehicles (including hybrid vehicles and range extender vehicles).

The phrase "stop of the vehicle" refers to putting the vehicle in an untravelable state where the vehicle is not travelable in response to an operation by the driver. Examples of the stop of the vehicle include turning off the ignition in engine vehicles (IG-OFF), and stopping the control device such as the HV-ECU in motor vehicles.

The control command generation unit 111 performs detection processing that acquires detection information from at least one of the devices such as sensors included in the detector 130 (step S1001). The detection information is the data necessary for executing trigger determination processing (processing of step S1002).

The trigger state setting unit 113 performs trigger determination processing for generating the trigger establishment flag that determines whether or not to record the status data on the nonvolatile memory 14 with reference to the result of determination by the event generation determination unit 112 (step S1002). The status data represents the status of the vehicle or the status of an occupant of the vehicle. The trigger establishment flag, which is a flag indicating the state of establishment of a trigger, is used for determining whether or not to record the status data on the nonvolatile memory 14.

Next, the transmission processing unit 114 performs transmission processing for transmitting the CAN frame that carries the trigger establishment flag to the CAN bus 141 or the CAN bus 142 through the transmission-reception unit 18A (see FIG. 3) (step S1003).

The transmission processing unit 114 executes processing for transmitting the control command generated by the control command generation unit 111 and the trigger establishment flag generated by the trigger state setting unit 113 with reference to the result of determination by the event generation determination unit 112 toward a destination through the transmission-reception unit 18A (see FIG. 3). For example, the destination is a control target such as the brake ECU 110-3.

As a result, the CAN frame containing the control command generated by the control command generation unit 111 is transmitted to the control target such as the brake ECU 110-3 through the CAN 140 from the transmission-reception unit 18A (see FIG. 3). The CAN frame containing the trigger establishment flag generated by the trigger state setting unit 113 is transmitted to the data recording ECU 120 through the CAN 140 from the transmission-reception unit.

Figure 8:
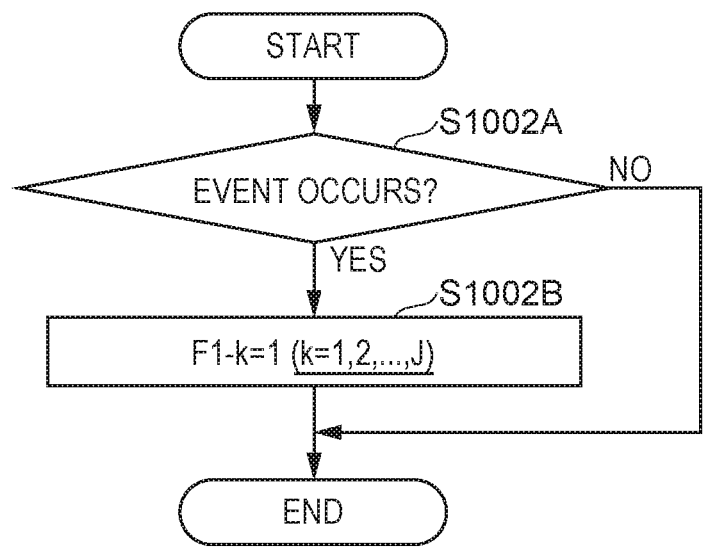
FIG. 8 is a flowchart illustrating one example of trigger determination processing.

FIG. 8 is a flowchart illustrating one example of the trigger determination processing, in which details of step S1002 in FIG. 7 is illustrated. The trigger determination process in FIG. 8 is executed for each type of event by the event generation determination unit 112 and the trigger state setting unit 113 which are provided for each type of event.

The trigger establishment flags F1-1 to F1-J are flags provided for each of J types of event to indicate whether or not the trigger is established. Hereinafter, the trigger establishment flag F1-k (k=1, 2, . . . , J) represents any one of the trigger establishment flags F1-1 to F1-J. Note that J is any natural number of 2 or more.

When the trigger establishment flag F1-k is "1", it signifies that the trigger state is the established state, which indicates that an event occurs. When the trigger establishment flag F1-k is "0", it signifies that the trigger state is the non-established state, which indicates that an event does not occur. An initial value of the trigger establishment flag F1-k at the startup of the vehicle is "0."

The event generation determination unit 112 determines whether or not an event that establishes the trigger occurs (step S1002A). Specifically, the event generation determination unit 112 determines whether or not the control command generation unit 111 generates a control command relating to event control, for example.

For example, the event generation determination unit 112 that responds to the PCS alert by the PCS-ECU 110-1 determines whether or not a control command relating to actuation of the PCS alert (for example, an alarm command that actuates the PCS alert) is generated.

Similarly, the event generation determination unit 112 that responds to the PCS brake by the PCS-ECU 110-1 determines whether or not a control command relating to actuation of the PCS brake (for example, an automatic brake command that actuates the PCS brake) is generated.

When the event generation determination unit 112 determines occurrence of the event that establishes the trigger (S1002A: YES), the event generation determination unit 112 advances the processing flow to step S1002B.

The trigger state setting unit 113 sets the trigger establishment flag F1-k to "1" (step S1002B).

When the processing of step S1002B is ended, the trigger determination process is ended (END).

When the event generation determination unit 112 determines in step S1002A that the event that establishes the trigger does not occur (S1002A: NO), the trigger determination processing is ended without execution of processing in step S1002B.

As described in the foregoing, the trigger state setting unit 113 periodically generates the trigger establishment flag F1-k indicating the trigger state with reference to the determination result by the event generation determination unit 112.

A description is now given of the functional configuration of the data recording ECU 120.

Figure 9:
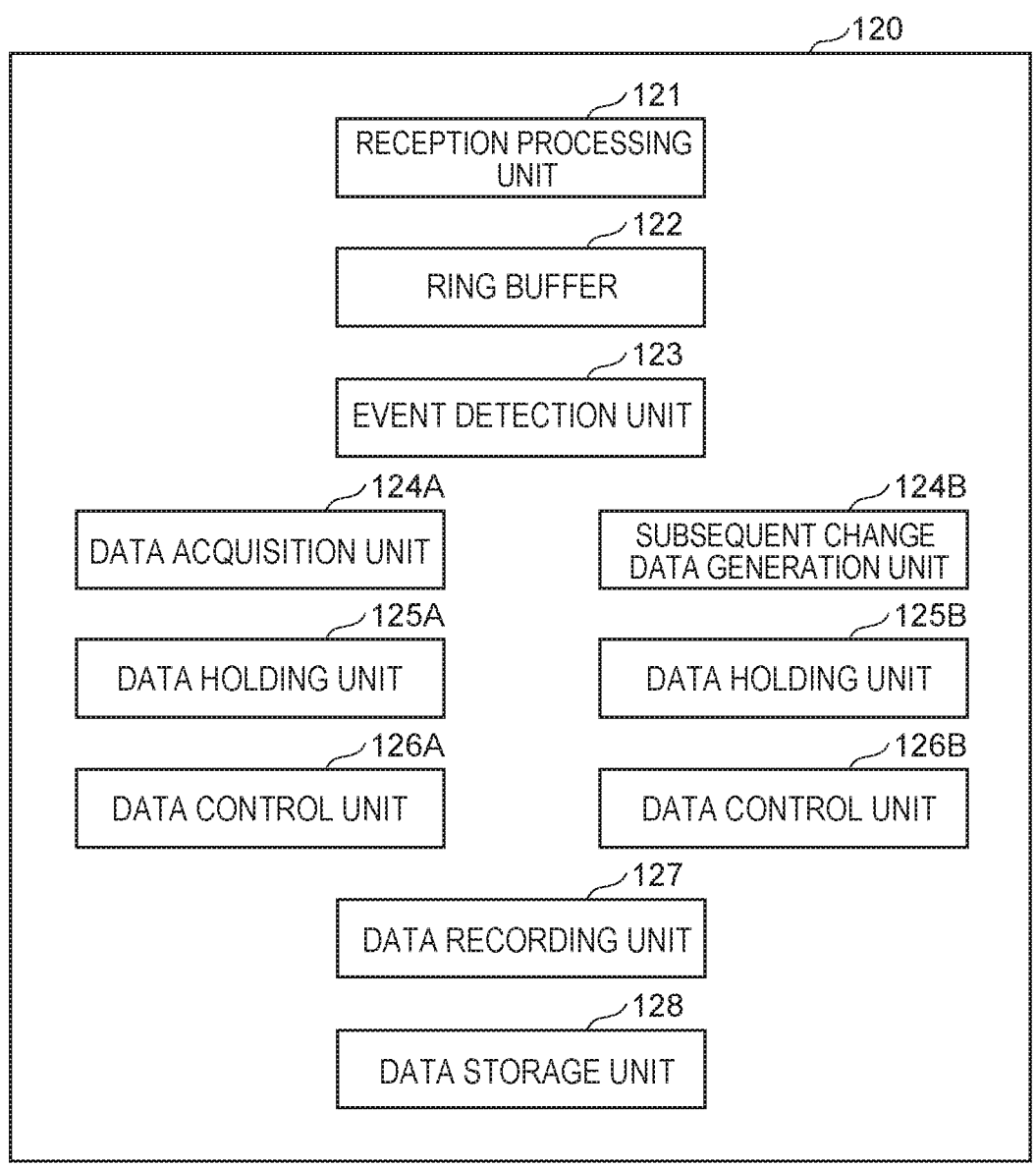
FIG. 9 illustrates the configuration of a data recording ECU.

FIG. 9 illustrates the configuration of the data recording ECU 120.

The data recording ECU 120 includes a reception processing unit 121, a ring buffer 122, an event detection unit 123, a data acquisition unit 124A, a subsequent change data generation unit 124B, data holding units 125A, 125B, data control units 126A, 126B, a data recording unit 127, and a data storage unit 128.

Among the component members of the data recording ECU 120 illustrated in FIG. 9, the reception processing unit 121, the event detection unit 123, the data acquisition unit 124A, the subsequent change data generation unit 124B, and the data control units 126A, 126B are depicted as function blocks, the functions of which are obtained when the CPU 11B (see FIG. 4) of the data recording ECU 120 executes programs.

Among the component members of the data recording ECU 120 illustrated in FIG. 9, the ring buffer 122 and the data holding units 125A, 125B are implemented by the RAM 12B (see FIG. 4). The ring buffer 122 and the data holding units 125A, 125B are formed by allocating part of the data recording region in the RAM 12 as the ring buffer 122 and the data holding units 125A, 125B.

Among the component members of the data recording ECU 120 illustrated in FIG. 9, the data recording unit 127 is formed by allocating part of the data recording region of the nonvolatile memory 14 (see FIG. 4) as the data recording unit 127. The data storage unit 128 is formed by allocating another part of the data recording region in the nonvolatile memory 14 (see FIG. 4) as the data storage unit 128.

The reception processing unit 121 receives the CAN frame input from the CAN bus 143 through the transmission-reception unit 18B (see FIG. 4) and executes processing of recording on the ring buffer 122 the status data extracted from the data field (see FIG. 2) in the CAN frame. The reception processing unit 121 extracts the status data from all the CAN frames transmitted by the CAN 140, and records the status data on the ring buffer 122.

The reception processing unit 121 also executes processing of extracting the trigger establishment flag and the event ID from the data field in the received CAN frame, and inputting the trigger establishment flag and the event ID into the event detection unit 123.

When occurrence of an event is detected by the event detection unit 123, the reception processing unit 121 extracts from the data field in the CAN frame the cumulative number of times of startup and time stamp data at the time of occurrence of the event. The cumulative number of times of startup and time stamp data at the time of occurrence of the event is one example of the first time data.

The ring buffer 122 sequentially records the status data extracted by the reception processing unit 121. The ring buffer 122 records the status data contained in all the CAN frames received by the reception processing unit 121. The ring buffer 122 is one example of the recording unit.

For example, the ring buffer 122 has data capacity for a prescribed number of periods (sampling periods) for sampling the status data. The ring buffer 122 can record all the status data for past α seconds before the current control period.

For example, when a sampling period is 0.5 seconds and α seconds is 10 seconds, the ring buffer 122 may have data capacity equivalent to the status data for at least 20 sampling periods.

When the latest status data acquired by the reception processing unit 121 is recorded on the ring buffer 122, a recording region where the oldest status data is recorded is overwritten with the latest status data.

The event detection unit 123 reads out the trigger establishment flags and the events ID input from the reception processing unit 121, and detects occurrence of an event and the type of the event. The type of event is detected because the type of status data that the data acquisition unit 124A extracts from the status data recorded on the ring buffer 122 is different depending on the type of the event.

Upon detection of occurrence of an event based on the trigger establishment flag, the event detection unit 123 notifies of the occurrence of the event and the event ID the reception processing unit 121 and the data acquisition unit 124A. Upon detection of the occurrence of the event, the event detection unit 123 also notifies of the occurrence of the event the subsequent change data generation unit 124B.

As a result, the reception processing unit 121 extracts the cumulative number of times of startup and time stamp data from the data field in the CAN frame. This is for acquiring the cumulative number of times of startup and the time stamp that identify the time when the event occurs.

When the data acquisition unit 124A is notified of the occurrence of the event and the event ID from the event detection unit 123, the data acquisition unit 124A executes data acquisition processing described below. The processing performed by the subsequent change data generation unit 124B when the subsequent change data generation unit 124B is notified of the occurrence of the event from the event detection unit 123 will be described after the data acquisition processing by the data acquisition unit 124A is described.

When the data acquisition unit 124A is notified of the occurrence of the event and the event ID from the event detection unit 123, the data acquisition unit 124A acquires only the status data relating to the event ID from all the status data recorded on the ring buffer 122 for past α seconds before the current control period, and records the data on the data holding unit 125A. In this case, the data acquisition unit 124A records on the data holding unit 125A the status data relating to the event ID in association with the event ID.

For example, when the sampling period is 0.5 seconds and α seconds is 10 seconds, the data acquisition unit 124A may acquire only the status data relating to the event ID from the status data for past 20 periods recorded on the ring buffer 122, and may record on the data holding unit 125A the status data in association with the event ID.

When the data acquisition unit 124A is notified of the occurrence of the event and the event ID from the event detection unit 123, the data acquisition unit 124A acquires only the status data relating to the event ID from all the status data recorded on the ring buffer 122 until β seconds elapse after the current control period, and records the data on the data holding unit 125A. In this case, the data acquisition unit 124A records on the data holding unit 125A the status data relating to the event ID until β seconds elapse, the status data relating to the event ID for past α seconds, and the event ID in association with each other.

All the status data recorded on the ring buffer 122 until β seconds elapse after the current control period refers to all the status data recorded on the ring buffer 122 until β seconds elapse after the current control period, the status data including the status data recorded on the ring buffer 122 in the current control period.

For example, when the sampling period is 0.5 seconds and β seconds is 10 seconds, the data acquisition unit 124A may acquire only the status data relating to the event ID from the status data recorded on the ring buffer 122 over 21 periods after the current control period, the status data including the current control period, and may record on the data holding unit 125A the status data relating to the event ID for past α seconds in association with the event ID.

When the data acquisition unit 124A is notified of the occurrence of an event from the event detection unit 123, the data acquisition unit 124A acquires from the reception processing unit 121 the cumulative number of times of startup and time stamp data at the time of occurrence of the event, and records on the data holding unit 125A the cumulative number of times of startup and time stamp data at the time of occurrence of the event.

As a result, recorded on the data holding unit 125A in association with each other are the event ID of the event that occurs, the status data relating to the event ID among the status data recorded on the ring buffer 122 for α seconds before occurrence of the event, the status data relating to the event ID among the status data recorded on the ring buffer 122 until β seconds elapse after occurrence of the event, and the cumulative number of times of startup and time stamp data at the time of occurrence of the event.

Thus, the status data relating to the event ID among the status data recorded on the ring buffer 122 is one example of the second data When the subsequent change data generation unit 124B is notified of the occurrence of the event from the event detection unit 123, the subsequent change data generation unit 124B executes data generation processing and data recording processing described below.

When the subsequent change data generation unit 124B is notified of the occurrence of the event from the event detection unit 123, the subsequent change data generation unit 124B determines whether or not a subsequent change (a specified operation or a specified change in state of an occupant) occurs within γ minutes from the occurrence of the event.

More specifically, when the subsequent change data generation unit 124B is notified of the occurrence of the event from the event detection unit 123, the subsequent change data generation unit 124B determines whether or not the current control period is performed within γ minutes after occurrence of the event. When the current control period is performed within γ minutes after occurrence of the event, the subsequent change data generation unit 124B determines whether or not the subsequent change occurs in the current control period.

When the subsequent change data generation unit 124B determines that the subsequent change occurs, the subsequent change data generation unit 124B generates subsequent change data representing the subsequent change that occurs, while acquiring the cumulative number of times of startup and time stamp data indicating the time of occurrence of the subsequent change, and records on the data holding unit 125B the subsequent change data, and the cumulative number of times of startup and time stamp data at the time of occurrence of the subsequent change in association with each other. The cumulative number of times of startup and time stamp data indicating the time of occurrence of the subsequent change is one example of the second time data.

The subsequent change data generation unit 124B executes such data generation processing and data recording processing for recording data on the data holding unit 125B in each control period.

Here, γ minutes is 10 minutes, for example. This is for monitoring the subsequent change that may occur based on an action of the occupant of the vehicle over about 10 minutes after occurrence of the event. Thus, to monitor the subsequent change that may occur based on the action of the occupant of the vehicle, γ minutes is set to be longer than β seconds during which the status data is recorded on the ring buffer 122 after occurrence of the event.

The subsequent change data generation unit 124B determines whether or not γ minutes elapse from the occurrence of the event by counting control clock generated by the clock generation unit 15B.

A method that the subsequent change data generation unit 124B determines whether or not a subsequent change occurs will be described later with reference to FIG. 12.

The data holding unit 125A holds data such as status data acquired from the ring buffer 122 by the data acquisition unit 124A. More specifically, recorded on the data holding unit 125A in association with each other are the event ID of the event that occurs, the status data relating to the event ID among the status data recorded on the ring buffer 122 for α seconds before occurrence of the event, the status data relating to the event ID among the status data recorded on the ring buffer 122 until β seconds elapse after occurrence of the event, and the cumulative number of times of startup and time stamp data at the time of occurrence of the event. The data holding unit 125A is one example of the first holding unit.

The data holding unit 125B holds the subsequent change data representing a subsequent change occurring within γ minutes after occurrence of the event, and the cumulative number of times of startup and time stamp data representing the time of occurrence of the subsequent change in association with each other. The subsequent change data and the cumulative number of times of startup and time stamp data recorded on the data holding unit 125B are recorded on the data recording unit 127 by the data control unit 126B. The data holding unit 125B is one example of the second holding unit.

After all the status data acquired from the ring buffer 122 by the data acquisition unit 124A is held in the data holding unit 125A, the data control unit 126A records on the data recording unit 127 the event ID of the event that occurs, the status data held in the data holding unit 125A, and the cumulative number of times of startup and time stamp data at the time of occurrence of the event in association with each other. The data control unit 126A is one example of the first data control unit.

The status data recorded on the data recording unit 127 includes the status data relating to the event ID among the status data recorded on the ring buffer 122 for α seconds before occurrence of the event, and the status data relating to the event ID among the status data recorded on the ring buffer 122 until β seconds elapse after occurrence of the event.

When the data holding unit 125B holds the subsequent change data and the cumulative number of times of startup and time stamp data in association with each other, and when the subsequent change data held in the data holding unit 125B and the cumulative number of times of startup and time stamp data satisfy a specified condition, the data control unit 126B records these data sets in association with the status data recorded on the data recording unit 127. The specified condition is the condition used to determine whether or not the data sets have high association with the status data recorded on the data recording unit 127. The data control unit 126B is one example of the second data control unit.

More specifically, the data control unit 126B refers to the cumulative number of times of startup and time stamp data at the time of occurrence of the event that is recorded on the data recording unit 127 to determine whether or not a difference in the number of times between the cumulative number of times of startup at the time of occurrence of the subsequent change in the subsequent change data held in the data holding unit 125B and the cumulative number of times of startup at the time of occurrence of the event is equal to or below a predetermined number of times and whether or not a time difference between the time stamp at the time of occurrence of the subsequent change in the subsequent change data held in the data holding unit 125B and the time stamp at the time of occurrence of the event is equal to or below a predetermined time (third time).

When the difference in the cumulative number of times of startup is equal to or below the predetermined number of times and the time difference in the time stamp is equal to or below the predetermined time, the data control unit 126B records the subsequent change data and the cumulative number of times of startup and time stamp data held in the data holding unit 125B in association with the status data recorded on the data recording unit 127.

In this case, the data control unit 126B records the status data recorded on the data recording unit 127 in association with the subsequent change data, the subsequent change data being in the state of associated with the cumulative number of times of startup and time stamp data at the time of occurrence of the subsequent change.

Here, the aforementioned specified condition is that the difference in the cumulative number of times of startup is equal to or below the predetermined number of times and the time difference in the time stamp is equal to or below the predetermined time. For example, the difference in the cumulative number of times of startup is 5 times or less, and the time difference in the time stamp is 10 minutes (γ minutes).

The data recording unit 127 records the event ID of an event that occurs, the status data relating to the event ID among the status data recorded on the ring buffer 122 for α seconds before occurrence of the event, the status data relating to the event ID among the status data recorded on the ring buffer 122 until β seconds elapse after occurrence of the event, and the cumulative number of times of startup and time stamp data at the time of occurrence of the event in association with each other.

The event ID of the event that occurs, the status data, and the cumulative number of times of startup and time stamp data at the time of occurrence of the event are recorded on a first recording region in the recording region of the data recording unit 127 by the data control unit 126A.

The data recording unit 127 also records the data that satisfies the specified condition, among the subsequent change data representing the subsequent change occurring within γ minutes after occurrence of the event and the cumulative number of times of startup and time stamp data, in association with the data recorded on the first recording region.

Among the subsequent change data representing the subsequent change occurring within γ minutes after occurrence of the event and the cumulative number of times of startup and time stamp data, the data that satisfies the specified condition is recorded on a second recording region in the recording region of the data recording unit 127 in the state of associated with the data recorded on the first recording region by the data control unit 126B.

Here, the specified condition is that the difference in the cumulative number of times of startup is equal to or below 5 times and the difference in the time stamp is 10 minutes (γ minutes) as one example.

The data storage unit 128 stores data in a table format required for processing that is executed by the time when the data recording ECU 120 records on the data recording unit 127 the data such as the status data before and after occurrence of the event and the subsequent change data. The data storage unit 128 is one example of the storage unit. The data stored in the data storage unit 128 will be described later with reference to FIGS. 10, 11 and 12.

FIG. 10 illustrates the data structure of an event database. The event database is one example of the database stored in the data storage unit 128.

The event database is data in a table format, the data including the event ID, an item representing an event content, and recording time, which are associated with each other. The item representing the event content indicates predetermined contents as the events to be detected by the in-vehicle recording system 100. The recording time represents recording time of the status data before and after occurrence of the event.

In FIG. 10, some of the events detected by the in-vehicle recording system 100 are illustrated as one example. The event ID is allocated to each event and the recording time is set for each event.

An event with the event ID of "1" is high accelerator opening at low-speed area. An event with the event ID of "2" is high accelerator opening at middle-speed area. An event with the event ID of "3" is a PCS actuation history.

Here, the low-speed area is the area where the vehicle speed is 30 km/h or less, for example. The high accelerator opening is the accelerator opening of 80% or more. The middle-speed area is the area where the vehicle speed is 60 km/h or less, for example. The PCS actuation history signifies actuation of the PCS alert buzzer, for example.

The recording time before occurrence of the event with the event ID of "1" is 5 seconds, and the recording time after occurrence of the event with the event ID of "1" is 5 seconds. The recording time before occurrence of the event with the event ID of "2" is 5 seconds, and the recording time after occurrence of the event with the event ID of "2" is 5 seconds. The recording time before occurrence of the event with the event ID of "3" is 10 seconds, and the recording time after occurrence of the event with the event ID of "3" is 10 seconds.

Thus, the event database is data in a table format, the data being set to include the event ID, the event to be detected (event item), and recording time in association with each other. The in-vehicle recording system 100 detects an event using the event database.

FIG. 11 illustrates the data structure of an associated database including the status data and the event ID associated with each other. The associated database illustrated in FIG. 11 is one example of the database stored in the data storage unit 128.

In the associated database, each status data is associated with the event IDs that requires the pertinent status data. The data illustrated in FIG. 11 is part of the data necessary for the in-vehicle recording system 100.

For example, the vehicle speed status data is associated with the event ID 1, 2, 3, . . . , which indicates that the vehicle speed status data is necessary for recording of the events having event ID 1, 2, 3, . . . .

The accelerator opening ratio status data is associated with the event ID 1, 2, 3, . . . , which indicates that the accelerator opening ratio status data is necessary for recording of the events with the event ID 1, 2, 3, . . . .

The engine speed status data is associated with the event ID 1, 2, 3, . . . , which indicates that the engine speed status data is necessary for recording of the events having event ID 1, 2, 3, . . . .

When an event occurs, the in-vehicle recording system 100 records the status data associated with the event ID over a period before and after occurrence of the event using the associated database that associates the status data and the event IDs in such a manner.

FIG. 12 illustrates the data structure of a subsequent change database representing subsequent change phenomena. The subsequent change database is one example of the database stored in the data storage unit 128.

The subsequent change database is a database including a subsequent change ID, a subsequent change phenomenon, expected time, and a threshold in association with each other.

The subsequent change ID is an identifier allocated to distinguish each subsequent change phenomenon. Here, the subsequent change IDs A001 to A010 are illustrated as examples. The subsequent change ID, which is subsequent change data representing a subsequent change phenomenon occurring within predetermined time after occurrence of an event, is one example of the third data. The predetermined time after occurrence of the event is one example of the third time.

The subsequent change phenomenon is a phenomenon to be monitored so as to check whether or not a change occurs after occurrence of the event. The subsequent change phenomenon is classified into either a specified operation or a specified change in state of an occupant.

The expected time, which is the time for determining whether or not the subsequent change phenomenon occurs after occurrence of the event, is the time when occurrence of the phenomenon is expected. The expected time is different for each subsequent change phenomenon. This is because the time when the subsequent change is expected to occur is different depending on the type of each subsequent change phenomenon.

The threshold is used as a determination criterion in determining whether or not a subsequent change phenomenon occurs. The threshold is associated with the subsequent change phenomenon that requires the determination criterion in determination. The threshold is not associated with the subsequent change phenomenon that does not require the determination criterion in determination.

While the details will be described later, whether or not each of the subsequent change phenomena occurs can be determined based on the status data contained in the data field of the CAN frame. The determination processing is executed by the subsequent change data generation unit 124B (see FIG. 9).

The subsequent change data generation unit 124B determines whether or not the status data representing a subsequent change phenomenon included in the subsequent change database illustrated in FIG. 12 is contained in the data field of the CAN frame so as to determine whether or not the subsequent change occurs.

FIG. 12 illustrates subsequent change events including extremely low-speed travel, vehicle stop, hazard lamp flashing, PCS ON-OFF switching, communication to a call center, IG ON-OFF switching, detection of brake oil pressure equal to or above specified level, detection of steering torque equal to or above specified level, detection of acceleration equal to or above specified level, and rate of change in heart rate equal to or above specified level, and heart rate equal to or above specified beat per minute (BPM).

Each of these subsequent change phenomena are associated with the subsequent change ID, the expected time, and the threshold. The subsequent change IDs A001 to A010 are allocated to subsequent change phenomena from "extremely low-speed travel" to "heart rate equal to or above specified BPM."

For example, the extremely low-speed travel, which is low speed travel at vehicle speeds of 5 km/h or less, is one example of the specified operation. Examples of the extremely low-speed travel include the case where after occurrence of an event such as driving assist of the vehicle, the content of control on the vehicle by the event is different from the content assumed by an occupant, so that the occupant drives slowly to wait and see how the things are going.

Here, the threshold for the extreme low-speed travel is set to 5 km/h, for example. Accordingly, the extreme low-speed travel can be detected by monitoring the status data representing the vehicle speed so as to monitor that the vehicle speed becomes 5 km/h or less. The threshold of the extreme low-speed travel is not limited to 5 km/h, but may be set to any value other than 5 km/h.

The event such as driving assist refers to not only the event of control on the vehicle by the driving assist but also the events such as a quick brake and a steep turn unrelated to the driving assist.

The case where the content of control on the vehicle by the event is different from the content assumed by the occupant includes the case where a phenomenon different from an assumed one occurs because the occupant is ignorance of correct functions of equipment of the vehicle.

The vehicle stop refers to the vehicle speed becoming 0 km/h, for example. The vehicle stop is one example of the specified operation. Examples of the vehicle stop include the case where after occurrence of an event such as the driving assist of the vehicle, the content of control on the vehicle by the event is different from the content assumed by an occupant, so that the occupant stops the vehicle to wait and see how things are going.

Here, a threshold of the vehicle stop is set to 0 km/h, for example. Accordingly, the vehicle stop can be detected by monitoring the status data representing the vehicle speed so as to monitor that the vehicle speed becomes 0 km/h. The threshold of the vehicle stop is not limited to 0 km/h, but may be set to any value other than 0 km/h.

The hazard lamp flashing, which refers to turning on a hazard lamp switch to flash the hazard lamp, is one example of the specified operation. Examples of the hazard lamp flashing include the case where after occurrence of an event such as driving assist of the vehicle, the content of control on the vehicle by the event is different from the content assumed by an occupant, so that the hazard lamp switch is pressed to notify of the presence of the own vehicle other vehicles around the own vehicle while waiting and seeing how things are going.

The hazard lamp flashing can be detected from the status data representing pressing of the hazard lamp switch. Accordingly, a threshold is not provided for the item of the hazard lamp flashing.

The PCS ON-OFF switching, which indicates that a switch for turning on and off the PCS is operated, is one example of the specified operation. Examples of the PCS ON-OFF switching include the case where after actuation of the PCS or after occurrence of an event such as a driving assist event other than the PCS event, the content of control on the vehicle by the event is different from the content assumed by an occupant, so that the switch for turning on and off the PCS is operated to wait and see how things are going.

The PCS ON-OFF switching can be detected from the status data representing the presence of operation of the switch for turning on and off the PCS. Accordingly, a threshold is not provided for the item of the PCS ON-OFF switching.

The communication to call center, which indicates that a switch is operated for communication to the call center, is one example of the specified operation. Examples of the communication to call center include the case where after occurrence of an event such as the driving assist event, the content of control on the vehicle by the event is different from the content assumed by an occupant, and so the switch for communication to a call center is operated to inquire the details of the various functions of the vehicle.

The communication to call center can be detected from the status data representing the presence of operation of the switch for communication to the call center. Accordingly, a threshold is not provided for the item of the communication to call center.

The IG ON-OFF switching, which indicates that operation for turning on and off the ignition switch is performed, is one example of the specified operation. Examples of the IG ON-OFF switching include the case where after occurrence of an event such as the driving assist event, the content of control on the vehicle by the event is different from the content assumed by an occupant, so that the operation for turning on and off the ignition switch is performed to restart the vehicle.

The IG ON-OFF switching can be detected from the status data representing the presence of operation for turning on and off the ignition switch. Accordingly, a threshold is not provided for the item of the IG ON-OFF switching.

The detection of brake oil pressure equal to or above specified level indicates that the hydraulic pressure in the master cylinder becomes a specified value or more, for example. The detection of brake oil pressure equal to or above specified level is one example of the specified operation detected when braking operation that is sudden to some extent is performed. Examples of the detection of brake oil pressure equal to or above specified level include the case where after occurrence of an event such as the driving assist event, relatively sudden deceleration becomes necessary, so that the hydraulic pressure in the master cylinder becomes a specified value or more.

Here, a threshold for detecting the brake oil pressure equal to or above specified level is set to a value XXX as one example. The value XXX, which is a specific brake oil pressure when braking operation that is sudden to some extent is performed, is expressed with symbols here.

The brake oil pressure equal to or above specified level can be detected by monitoring the status data representing the brake oil pressure so as to monitor that the brake oil pressure becomes the value XXX or more. The threshold for detecting the brake oil pressure equal to or above specified level is not limited to the value XXX, but may be set to values other than the value XXX.

The detection of steering torque equal to or above specified level indicates, for example, that a detection value of a torque sensor becomes a specified value or more, the torque sensor detecting a steering wheel torque input into steering wheels. The detection of steering torque equal to or above specified level is one example of the specified operation detected when steering operation that is sudden to some extent is performed. Examples of the detection of steering torque equal to or above specified level include the case where after occurrence of an event such as the driving assist event, relatively sudden steering operation becomes necessary, and so the detection value of the torque sensor becomes a specified value or more.

Here, a threshold for detecting the steering torque equal to or above specified level is set to a value XXY as one example. The value XXY, which is a detection value of the torque sensor when steering operation that is sudden to some extent is performed, is expressed with symbols here.

The detection of steering torque equal to or above specified level can be detected by monitoring the status data representing the detection value of the torque sensor so as to monitor that the detection value of the torque sensor becomes the value XXY or more. The threshold for detecting the steering torque equal to or above specified level is not limited to the value XXY, but may be set to any value other than the value XXY.

The rate of change in heart rate equal to or above specified level indicates that the rate of change in heart rate detected based on an electrode that detects the heart rate of an occupant (driver in particularly) becomes a specified rate of change or more. The rate of change in heart rate equal to or above specified level is one example of the specified change in state of an occupant.

The rate of change in heart rate equal to or above specified level may be detected by, for example, arranging the status data representing the rate of change in heart rate to be contained in the data field of the CAN frame, and making the subsequent change data generation unit 124B monitor whether or not the rate of change in heart rate is a specified value or more. The rate of change in heart rate is a rate of change in heart rate per second, for example.

Here, a threshold for determining whether or not the rate of change in heart rate is specified level or more is set to a value YYX as one example. The value YYX, which is a specific value indicating that the rate of change in heart rate is large to some extent for example, is expressed with symbols here.

The rate of change in heart rate equal to or above specified level can be detected by monitoring the status data representing the rate of change in heart rate so as to monitor that the rate of change in heart rate becomes YYX or more. A threshold for determining the rate of change in heart rate equal to or above specified level is not limited to the value YYX, but may be set to any value other than the value YYX.

The heart rate being specified BPM level or more indicates that the heart rate detected based on the electrode that detects the heart rate of an occupant (driver in particularly) becomes a specified value or more. The heart rate being specified BPM level or more is one example of the specified change in state of an occupant.

The heart rate being specified BPM level or more can be detected by, for example, arranging the status data representing the heart rate to be contained in the data field of the CAN frame and making the subsequent change data generation unit 124B monitor whether or not the heart rate is a specified value or more.

Here, a threshold for determining whether or not the heart rate is specified BPM level or more is set to a value YXX as one example. The value YXX, which is a specific value indicating that the heart rate is large to some extent for example, is expressed with symbols here.

The heart rate being specified BPM level or more can be detected by monitoring the status data representing the heart rate so as to monitor that the heart rate becomes YXX or more. A threshold for determining the heart rate being specified BPM level or more is not limited to the value YXX, but may be set to any value other than the value YXX.

Occurrence of looking-away driving and drowsy driving which can be determined based on a line of sight of the driver may be added to the specified change in state of an occupant.

The above-stated subsequent changes are merely exemplary, and other phenomena may further be added as the phenomena representing the specified operations or specified changes in state of the occupant. In the case of adding other phenomena, the status data may be arranged to be contained in the data field of the CAN frame, as in the case of the subsequent change phenomenon, described above so as to enable the subsequent change data generation unit 124B to detect the added phenomena from the status data.

It is not necessary to use all the events illustrated in FIG. 12, but some of the events may be used.

FIG. 13 illustrates one example of data such as the status data recorded on the first recording region of the data recording unit 127.

FIG. 13 illustrates an event ID, time before and after occurrence of an event (ms), accelerator opening (%), vehicle speed (km/h), engine speed (rpm), . . . . Among these items, the accelerator opening (%), the vehicle speed (km/h), the engine speed (rpm), . . . are status data.

As for the time before and after occurrence of an event (millisecond (ms)), the time before occurrence of the event is expressed with a minus symbol and time after occurrence of the event is expressed with a plus symbol with the time of occurrence of the event being defined as zero (ms). The time when the event occurs is identified by the cumulative number of times of startup and the time stamp at the time of occurrence of the event.

In FIG. 13, the time from −10,000 (ms) to +10,000 (ms) is illustrated in increments of 500 (ms) as one example. This arrangement corresponds to the case where both α seconds and β seconds are set to 10 seconds. The time when an event occurs (time of occurrence) is synonymous with the time of detection of the event.

The accelerator opening is data representing a stepping-in amount of the accelerator in percentage (%). The vehicle speed is the speed detected by the vehicle speed sensor and is expressed by kilometer per hour (km/h). The engine speed is a rotational speed of the engine detected by a crank angle sensor, and is expressed by rotation speed per minute (rpm).

The data illustrated in FIG. 13 is one example of the status data relating to an event ID obtained, out of the status data recorded on the ring buffer 122, from α second before occurrence of an event to β second after occurrence of the event by the data acquisition unit 124A based on the event ID notified from the event detection unit 123 with reference to the data illustrated in FIGS. 10 and 11.

In FIG. 13, the time before and after occurrence of the event (milliseconds (ms)) is illustrated for the sake of description. However, the number of sampling periods for sampling the status data by the data acquisition unit 124A may be used in place of the time before and after occurrence of the event.

In this case, the time of occurrence of the event (0 (ms)) is replaced with a current sampling period (periodic number 1), the time before occurrence is replaced with a period before the current sampling period, and the time after occurrence is replaced with a period after the current sampling period.

For example, when the status data is recorded from 10 seconds before occurrence of the event to 10 seconds after occurrence of the event with a sampling period of 0.5 seconds, the status data may be recorded from 20 periods before occurrence of the event (−20 period) to 20 periods after occurrence of the event (21 periods).

Although the cumulative number of times of startup and time stamp data at the time of occurrence of the event are not directly illustrated in FIG. 13, the cumulative number of times of startup and time stamp data at the time of occurrence of the event are contained in the status data as the time of occurrence of an event, which is identified by the cumulative number of times of startup and the time stamp at the time of occurrence of the event, in the state associated with other data.

FIG. 14 illustrates one example of the subsequent change ID, the cumulative number of times of startup data, and the time stamp data recorded on the second recording region of the data recording unit 127. Here, in FIG. 14, the cumulative number of times of startup is expressed as TRIP, and the time stamp is expressed as TIMESTAMP.

In FIG. 14, a phenomenon with the subsequent change ID A001 occurs when the cumulative number of times of startup is 246 and the time stamp is 1,125 (seconds (s)). The phenomenon with the subsequent change ID A001 is extremely low-speed travel.

A phenomenon with the subsequent change ID A003 occurs when the cumulative number of times of startup is 246 and the time stamp is 1,145 (seconds (s)). The phenomenon with the subsequent change ID A003 is hazard lamp flashing.

The phenomenon with the subsequent change ID A001 occurs when the cumulative number of times of startup is 247 and the time stamp is 150 (seconds (s)). The phenomenon with the subsequent change ID A001 is extremely low-speed travel.

The subsequent change IDs, the cumulative number of times of startup data, and the time stamp data as described in the foregoing are generated by the subsequent change data generation unit 124B, held in the data holding unit 125B, and then are recorded on the second recording region of the data recording unit 127 by the data control unit 126B. In this case, these data are associated with data such as the status data recorded on the first recording region of the data recording unit 127.

FIG. 15 illustrates data recorded on the first recording region and the second recording region of the data recording unit 127.

The data recording unit 127 has four regions as one example. In each of four regions, the status data and the subsequent change data when an event occurs can be recorded. Since the data recording unit 127 has four regions, the status data and the subsequent change data relating to occurrence of up to four events can be recorded.

Here, assume the case where a fifth event occurs as one example. In this case, the status data and the subsequent change data when the first to fourth events occur are preferentially recorded, and therefore the status data and the subsequent change data relating to occurrence of the fifth event are not recorded.

As illustrated in FIG. 15, the status data with the event ID 3 is recorded on a region 1. One example of the status data with the event ID 3 is as illustrated in FIG. 13. The status data with the event ID 3 has the cumulative number of times of startup and time stamp data at the time of occurrence of the event, and the status data including the accelerator opening, the vehicle speed, and the engine speed. Thus, the status data is recorded in a subregion of the region 1 of the data recording unit 127, the subregion being one example of the first recording region.

In the region 1, three sets of subsequent change data are recorded. The three sets of subsequent change data are: a phenomenon with the subsequent change ID being A001, the cumulative number of times of startup being 246, and the time stamp being 1,125 (s); a phenomenon with the subsequent change ID being A003, the cumulative number of times of startup being 246, and the time stamp being 1,145 (s); a phenomena with the subsequent change ID being A001, the cumulative number of times of startup being 247, and the time stamp being 150 (s).

These three sets of subsequent change data are the same as three sets of subsequent change data illustrated in FIG. 14. Thus, the subsequent change data is recorded on a subregion of the region 1 of the data recording unit 127, the subregion being one example of the second recording region.

As described in the foregoing, as illustrated in FIG. 15, the cumulative number of times of startup and time stamp data at the time of occurrence of the subsequent change, the event ID, the status data, the subsequent change data, and the cumulative number of times of startup and the time stamp at the occurrence of the subsequent change data are recorded on the data recording unit 127 in association with each other.

Figure 16:
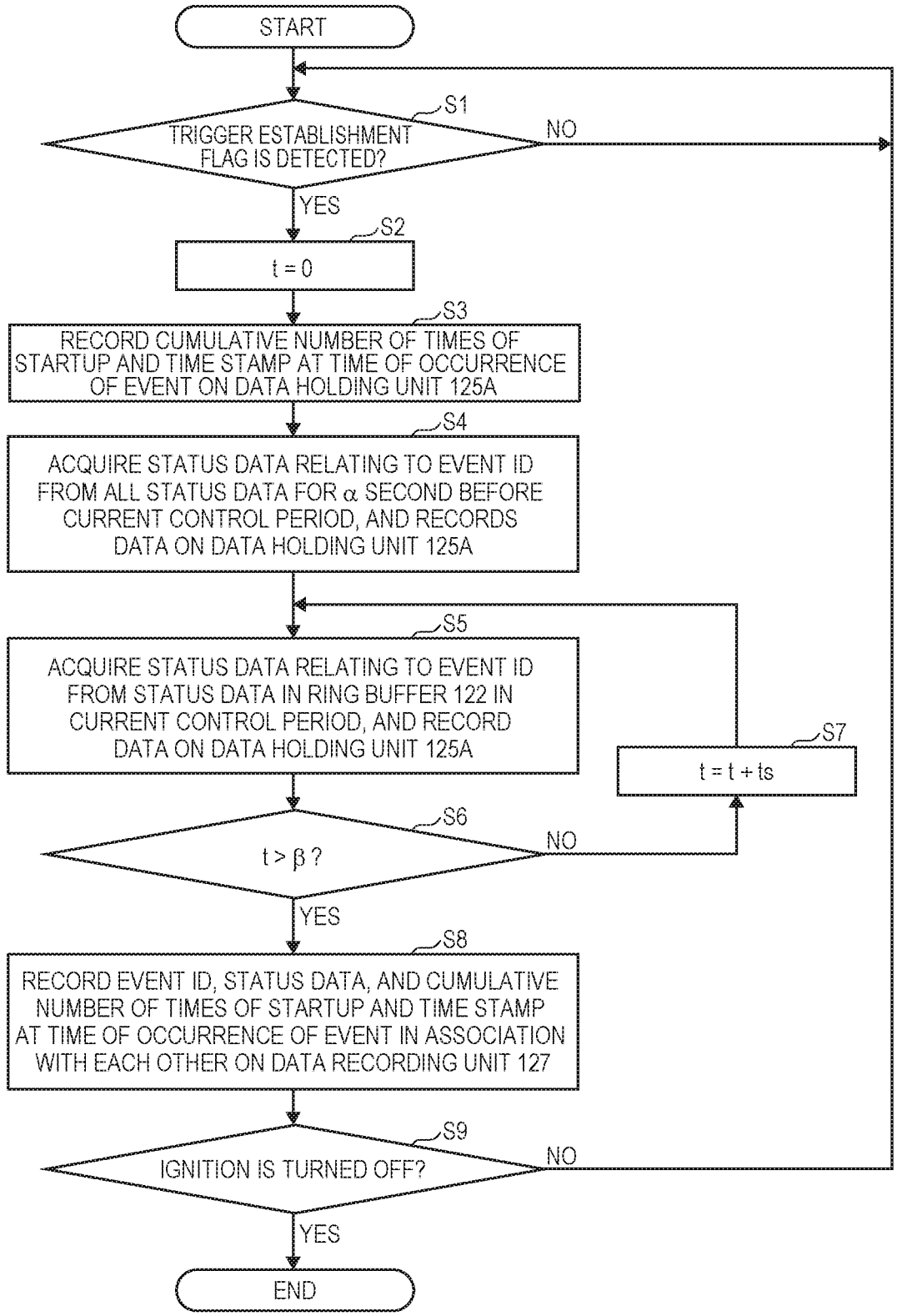
FIG. 16 is a flowchart illustrating processing executed by the data recording ECU to record status data at the time of occurrence of an event.

FIG. 16 is a flowchart illustrating processing executed by the data recording ECU 120 to record the status data at the time of occurrence of an event.

The data recording ECU 120 starts processing when the ignition is turned on and the vehicle is started (START).

The data recording ECU 120 determines whether or not a trigger establishment flag is detected (step S1). The data recording ECU 120 repeatedly executes the processing of step S1 until the trigger establishment flag is detected. The processing of step S1 is executed by the event detection unit 123.

When the data recording ECU 120 determines that the trigger establishment flag is detected (S1:YES), the data recording ECU 120 resets cumulative time t of the time stamp to zero (step S2). This is for integrating the time elapsed after occurrence of the event.

The processing of step S2 is executed by the event detection unit 123. Upon detection of the trigger establishment flag (detection of occurrence of an event), the event detection unit 123 notifies of the occurrence of the event and the event ID the reception processing unit 121 and the data acquisition unit 124A, and also notifies of the occurrence of the event the subsequent change data generation unit 124B. The trigger establishment flag and the event ID are input into the event detection unit 123 from the reception processing unit 121.

The data recording ECU 120 acquires the cumulative number of times of startup and time stamp data at the time of occurrence of the event, and records the data on the data holding unit 125A (step S3). The processing of step S3 is performed by the data acquisition unit 124A. The data acquisition unit 124A acquires the cumulative number of times of startup and time stamp data at the time of occurrence of the event from the reception processing unit 121.

The data recording ECU 120 acquires only the status data relating to the event ID from all the status data for past α seconds before the current control period, and records the data on the data holding unit 125A (step S4). The processing of step S4 is performed by the data acquisition unit 124A. The event ID is notified from the event detection unit 123.

The data representing α seconds can be obtained from the event database illustrated in FIG. 10 based on the event ID. The status data relating to the event ID can be obtained from the associated database illustrated in FIG. 11.

The data recording ECU 120 acquires only the status data relating to the event ID from all the status data recorded on the ring buffer 122 in the current control period, and records the data on the data holding unit 125A (step S5).

The processing of step S5 is executed by the data acquisition unit 124A. The data acquisition unit 124A records the status data for past α second, which is recorded on the data holding unit 125A in step S4, in association with the status data relating to the event ID acquired in the current control period.

The data recording ECU 120 determines whether or not the cumulative time t of the time stamp is longer than β seconds (step S6). This is for acquiring status data until β seconds elapse after occurrence of the event.

The processing of step S6 is executed by the data acquisition unit 124A. The data representing β seconds can be obtained from the event database illustrated in FIG. 10 based on the event ID.

When the data recording ECU 120 determines that the cumulative time t of the time stamp is not longer than β seconds (S6:NO), the data recording ECU 120 adds specified sampling period time ts to the cumulative time t of the time stamp (step S7). The sampling period time ts is the time for one sampling period. Here, ts is 0.5 seconds as one example. The processing of step S7 is executed by the data acquisition unit 124A.

When the data recording ECU 120 determines that the cumulative time t of the time stamp is longer than β seconds (S6: YES), the data recording ECU 120 records on the data recording unit 127 the event ID of the event that occurs, the status data held in the data holding unit 125A, and the cumulative number of times of startup and time stamp data at the time of occurrence of the event in association with each other (step S8). The processing of step S8 is performed by the data control unit 126A.

Thus, recorded in association with each other on the first recording region of the data recording unit 127 are: the event ID of an event that occurs; the status data relating to the event ID among the status data recorded on the ring buffer 122 for a seconds before occurrence of the event; the status data relating to the event ID among the status data recorded on the ring buffer 122 until β seconds elapse after occurrence of the event; and the cumulative number of times of startup and time stamp data at the time of occurrence of the event.

After the processing of step S8 is ended, the data recording ECU 120 determines whether or not the ignition is turned off (step S9). This is for determining whether or not to end a series of processing.

Here, for the sake of description, it is determined whether or not the ignition is turned off in step S9. However, in the first embodiment, the data recording ECU 120 constitutes part of the airbag ECU, and since the airbag ECU has an internal power source, the data recording ECU 120 is not immediately turned off even when the ignition is turned off.

Accordingly, in the case where the data recording ECU 120 is not immediately turned off due to electric power supply from an internal power source even when the ignition is turned off as in the case of the data recording ECU 120 in the first embodiment, it may be determined whether or not power supply voltage supplied to the data recording ECU 120 is less than a threshold instead of whether or not the ignition is turned off in step S9. When the electric power is not supplied to the data recording ECU 120 from the internal power source, it may be determined whether or not the ignition is turned off in step S9.

When the data recording ECU 120 determines that the ignition is not turned off (S9: NO), the data recording ECU 120 returns the processing flow to step S1.

Figure 17:
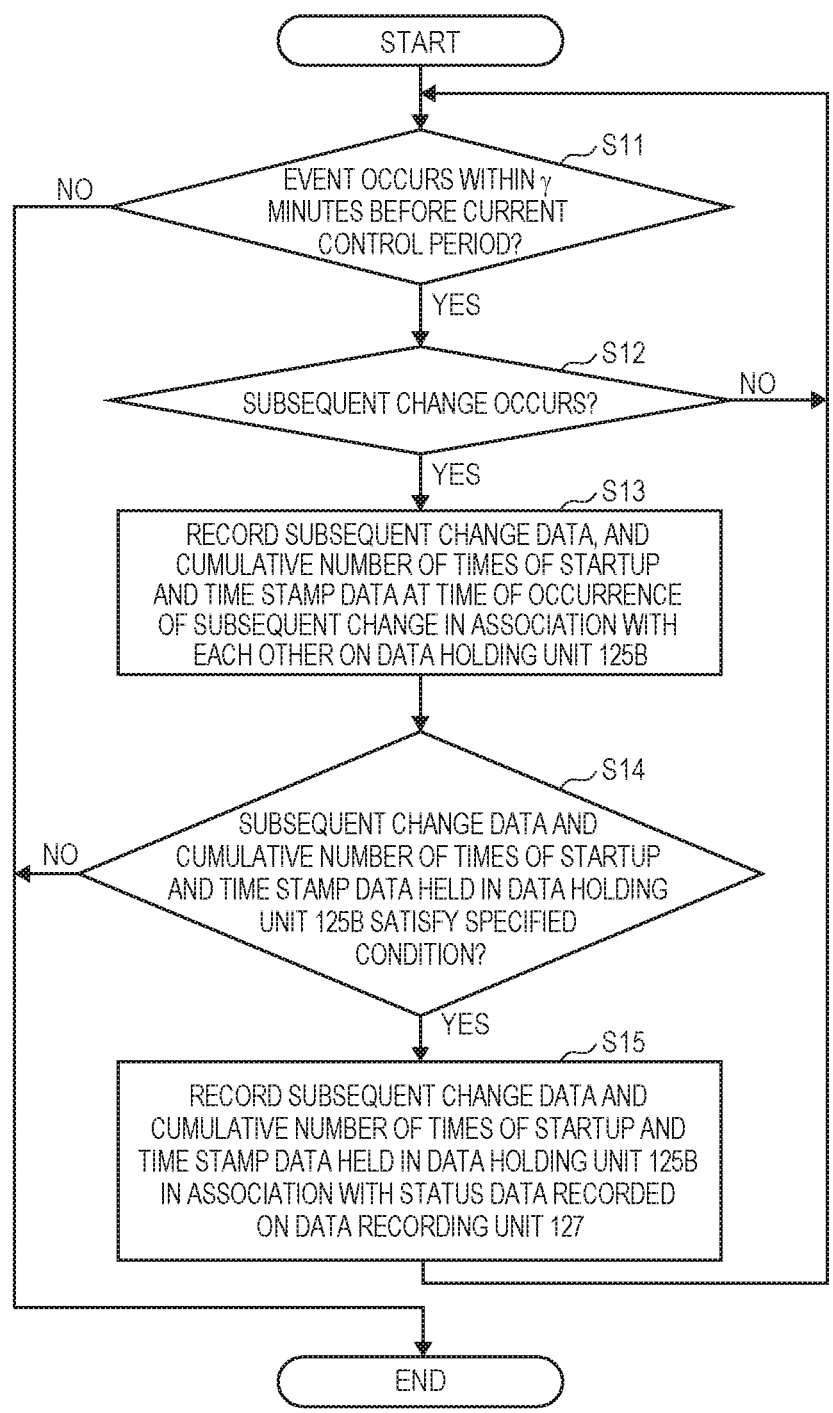
FIG. 17 is a flowchart illustrating processing executed by the data recording ECU to record the subsequent change data, the cumulative number of times of startup data and the time stamp data at the time of occurrence of an event.

Contrary to this, when the data recording ECU 120 determines that the ignition is turned off (S9: YES), a series of processing is ended (END). Thus, a series of processing illustrated in FIG. 16 is ended FIG. 17 is a flowchart illustrating processing executed by the data recording ECU 120 to record the subsequent change data, and the cumulative number of times of startup and time stamp data at the time of occurrence of an event.

When the data recording ECU 120 is notified of occurrence of an event from the event detection unit 123, the data recording ECU 120 starts processing (START). The event detection unit 123 notifies of the occurrence of the event the subsequent change data generation unit 124B. Accordingly, the subsequent change data generation unit 124B starts the processing illustrated in FIG. 17.

The data recording ECU 120 determines whether or not the event occurs within γ minutes before the current control period (step S11). The processing of step S11 is executed by the subsequent change data generation unit 124B.

The subsequent change data generation unit 124B is notified of the occurrence of the event from the event detection unit 123 that detected the trigger establishment flag. Accordingly, when the subsequent change data generation unit 124B counts the control clock generated by the clock generation unit 15B (see FIG. 4) upon reception of the notification, and determines, during the current control period, whether or not γ minutes elapse from the occurrence of the event, the subsequent change data generation unit 124B can determine whether or not the event occurs within γ minutes before the current control period.

When the data recording ECU 120 determines that the event occurs within γ minutes before the current control period (S11: YES), then the data recording ECU 120 determines whether or not any subsequent change occurs (step S12). The processing of step S12 is performed by determining whether or not any subsequent change occurs by the subsequent change data generation unit 124B.

In step S12, the subsequent change data generation unit 124B determines whether or not the status data representing a subsequent change phenomenon included in the subsequent change database illustrated in FIG. 12 is contained in the data field of the CAN frame so as to determine whether or not the subsequent change occurs.

The subsequent change data generation unit 124B determines that the subsequent change occurs when the status data representing at least one of the subsequent change phenomena included in the subsequent change database illustrated in FIG. 12 is contained in the data field of the CAN frame.

The subsequent change data generation unit 124B also determines that the subsequent change occurs when there are a plurality of sets of status data representing subsequent change phenomena included in the subsequent change database illustrated in FIG. 12.

In step S12, the subsequent change data generation unit 124B determines occurrence of the plurality of subsequent changes included in the subsequent change database illustrated in FIG. 12. When occurrence of the plurality of subsequent changes are determined, determination may be made in order of the subsequent change IDs, or may be made in order of priority by giving high priority to specified subsequent changes. For example, the PCS ON-OFF switching may be determined first.

When the data recording ECU 120 determines that the subsequent change occurs (S12:YES), the data recording ECU 120 generates subsequent change data representing the subsequent change that occurs, acquires the cumulative number of times of startup and time stamp data representing the time of occurrence of the subsequent change, and records the subsequent change data, and the cumulative number of times of startup and time stamp data at the time of occurrence of the subsequent change in association with each other on the data holding unit 125B (step S13). The processing of step S13 is executed by the subsequent change data generation unit 124B.

When the plurality of subsequent change phenomena occurs, subsequent change data representing the plurality of subsequent changes are generated, and the subsequent change data, and the cumulative number of times of startup and time stamp data at the time of occurrence of the subsequent changes are recorded in association with each other on the data holding unit 125B.

The data recording ECU 120 determines whether or not the subsequent change data and the cumulative number of times of startup and time stamp data, which are held in association with each other in the data holding unit 125B, satisfy a specified condition (step S14). The processing of step S14 is executed by the data control unit 126B.

Here, one example of the specified condition is that a difference in the cumulative number of times of startup is equal to or below 5 times and a difference in the time stamp is equal to or below 10 minutes (γ minutes). The time γ minutes is set to be longer than β seconds during which the status data is recorded on the ring buffer 122 after occurrence of the event. This is for monitoring operation such as operation of an occupant even after recording of the status data is ended.

More specifically, in step S14, the data control unit 126B refers to the cumulative number of times of startup and time stamp data at the time of occurrence of the event which is recorded on the first recording region of the data recording unit 127 so as to determine whether or not the difference in the number of times between the cumulative number of times of startup at occurrence of the subsequent change in the subsequent change data held in the data holding unit 125B and the cumulative number of times of startup at the time of occurrence of the event, equal to or below 5 times and the time difference between the time stamp at the time of occurrence of the subsequent change in the subsequent change data held in the data holding unit 125B and the time stamp at the time of occurrence of the event is equal to or below 10 minutes.

In step S11, whether or not the event occurs within γ minutes is determined in order to narrow down the subsequent changes occurring within 10 minutes after occurrence of the event. In step S14, whether or not the difference in the time stamp is equal to or below 10 minutes (γ minutes) is determined in order to determine whether or not to associate the status data recorded on the first recording region of the data recording unit 127 with the subsequent change data. Therefore, the determination made in step S11 is different in concept from the determination made in step S14.

When it is determined that the specified condition is satisfied (S14:YES), the data recording ECU 120 records the subsequent change data and the cumulative number of times of startup and time stamp data held in the data holding unit 125B in association with the status data recorded on the data recording unit 127 (step S15). The processing of step S15 is executed by the data control unit 126B.

Accordingly, when the status data with event ID 3 is recorded on the first recording region in the region 1 illustrated in FIG. 15 for example, the status data with event ID 3 and the data including the subsequent change data and the cumulative number of times of startup and time stamp data, which satisfy the specified condition, are recorded on the second recording region of the region 1.

Thus, the subsequent change data is associated with the status data using the cumulative number of times of startup and the time stamp.

Once the processing of step S15 is ended, the data recording ECU 120 returns the processing flow to step S11. This is for determining whether or not a subsequent change occurs in the next control period.

When the data recording ECU 120 determines that the specified condition is not satisfied (S14:NO), the data recording ECU 120 ends a series of processing without recording on the data recording unit 127 the subsequent change data and cumulative number of times of startup and time stamp data held in the data holding unit 125B (END).

For example, when the difference in the cumulative number of times of startup is 6 times, the subsequent change data and the cumulative number of times of startup and time stamp data which are held in the data holding unit 125B are not recorded on the data recording unit 127. Once the difference in the cumulative number of times of startup reaches 6 times, the difference in the cumulative number of times of startup does not return to 5 times or less, and therefore a series of processing is ended.

Moreover, when the difference in the time stamp exceeds 10 minutes for example, the subsequent change data and the cumulative number of times of startup and time stamp data which are held in the data holding unit 125B are not recorded on the data recording unit 127. Once the difference in the time stamp exceeds 10 minutes, the difference does not return to 10 minutes or less, and therefore a series of processing is ended.

When the data recording ECU 120 determines in step S11 that the event does not occur within γ minutes before the current control period (S11: NO), the data recording ECU 120 ends a series of processing (END). The determination is made because the difference in the time stamp exceeds 10 minutes for example, and therefore in this case, a series of processing is ended.

When the ignition is turned off while a series of processing is executed, the data recording ECU 120 is not immediately turned off even with the ignition being turned off due to the internal power source of the airbag ECU that includes the data recording ECU 120

As a consequence, in the case where the ignition is turned off and then turned on again, the processing illustrated in FIGS. 16 and 17 is continuously executed, which results in increment of the cumulative number of times of startup by one.

As described in the foregoing, according to the in-vehicle recording system 100 of the first embodiment, when an event occurs, the status data generated before and after occurrence of the event, and the subsequent change data representing a subsequent change occurring during predetermined time after occurrence of the event, and the cumulative number of times of startup and time stamp data at the time of occurrence of the event and at the time of occurrence of the subsequent change can be recorded in association with each other on the data recording unit 127 (nonvolatile memory 14).

The subsequent change occurring in predetermined time after occurrence of an event is attributed to an operation of a vehicle by an occupant or a change in behavior or state of the occupant after control on the vehicle is performed by the driving assist and the like, so that the subsequent change may occur as a reaction to the vehicle control performed by the driving assist and the like.

Such a subsequent change may represent how the occupant felt about actions such as vehicle control performed by the driving assist and the like.

Therefore, it becomes possible to analyze how the occupant felt about actions such as the vehicle control performed by the driving assist and the like by reading the status data generated before and after occurrence of the event recorded on the data recording unit 127 (nonvolatile memory 14), the subsequent change data representing a subsequent change occurring during predetermined time after occurrence of the event, and the cumulative number of times of startup and time stamp data at the time of occurrence of the event and at the time of occurrence of the subsequent change with a dedicated PC connected to the terminal 19 (see FIG. 4).

The vehicle control by the driving assist device may cause a behavior that is unexpected or unforeseen for the occupant of the vehicle because it is difficult to take preference or way of thinking of various occupants into consideration.

However, when the in-vehicle recording system 100 of the first embodiment acquires the subsequent change data representing a subsequent change occurring during the predetermined time after occurrence of the event, and the cumulative number of times of startup and time stamp data at the time of occurrence of the subsequent change, it becomes possible to develop a control method of the vehicle in more consideration of the preference or way of thinking of more occupants.

Therefore, according to the first embodiment, it becomes possible to provide the in-vehicle control device (data recording ECU 120) and the in-vehicle recording system 100 capable of recording, upon occurrence of an event relating to the driving assist of the vehicle and the like, a reaction of the occupant to the event.

Since the subsequent change data and the cumulative number of times of startup and time stamp data at the time of occurrence of the subsequent change are associated, it becomes possible to verify how the subsequent change occurs in time series, so that actions such as operations performed by the occupant can carefully be verified.

Although the configuration in which the data recording unit 127 has four regions (see FIG. 15) has been described as one example, the number of the regions included in the data recording unit 127 is not limited to four but may be one or more.

Also in the configuration described, the data recording unit 127 has four regions, and when a fifth event occurs, the data recording unit 127 preferentially keeps the status data and the subsequent change data relating to occurrence of the first to fourth events. However, the status data and the subsequent change data about occurrence of the fifth event may be written over the status data and the subsequent change data on the first event.

In the configuration described in the foregoing, the time of sampling period ts to be added to the cumulative time t of the time stamp in step S7 illustrated in FIG. 16 is 0.5 second. However, the time of sampling period ts may be changed depending on the type of the event, for example. In this case, the data in which the event ID is associated with the sampling period may be used.

Moreover, in the configuration described in the foregoing, the subsequent change data and the status data are associated with each other using the cumulative number of times of startup and the time stamp which construct the time data representing the time when an action such as control on the vehicle is performed.

However, the subsequent change data and the status data may be associated with each other using the time information acquired by the navigation ECU 110-N (see FIG. 1) from a GPS signal instead of using the time data constructed with the cumulative number of times of startup and the time stamp. The time information acquired from the GPS signal is absolute time expressed in the form of year, month, date, hour, minute, and second.

Although the subsequent change ID representing the subsequent change data is used as one example of the third data in the configuration described in the foregoing, the data representing a subsequent change phenomenon may be used in place of the subsequent change ID. As the data representing the subsequent change phenomenon, a flag indicating a PCS actuation history and the like may be used for the PCS actuation history with the event ID 3, for example.

In the configuration described in the foregoing, the reception processing unit 121 extracts the cumulative number of times of startup and time stamp data from the data field of the CAN frame carried by the CAN 140. The body ECU 110-5 outputs the cumulative number of times of startup and time stamp data to the CAN 140.

However, when the data recording ECU 120 is integrated with the body ECU 110-5, the data recording ECU 120 may acquire the cumulative number of times of startup and time stamp data generated inside the data recording ECU 120 instead of acquiring the cumulative number of times of startup and time stamp data from the CAN 140. In this case, the data recording ECU 120 may acquire the cumulative number of times of startup and time stamp data at the time of occurrence of an event or at the time of occurrence of a subsequent change from the inside of the data recording ECU 120, for example.

In the configuration described in the foregoing, the data recording unit 127 has the first recording region and the second recording region, with the status data being recorded on the first recording region and the subsequent change data being recorded on the second recording region. The data recording unit 127 is implemented by the nonvolatile memory 14 (see FIG. 4).

Figure 18:
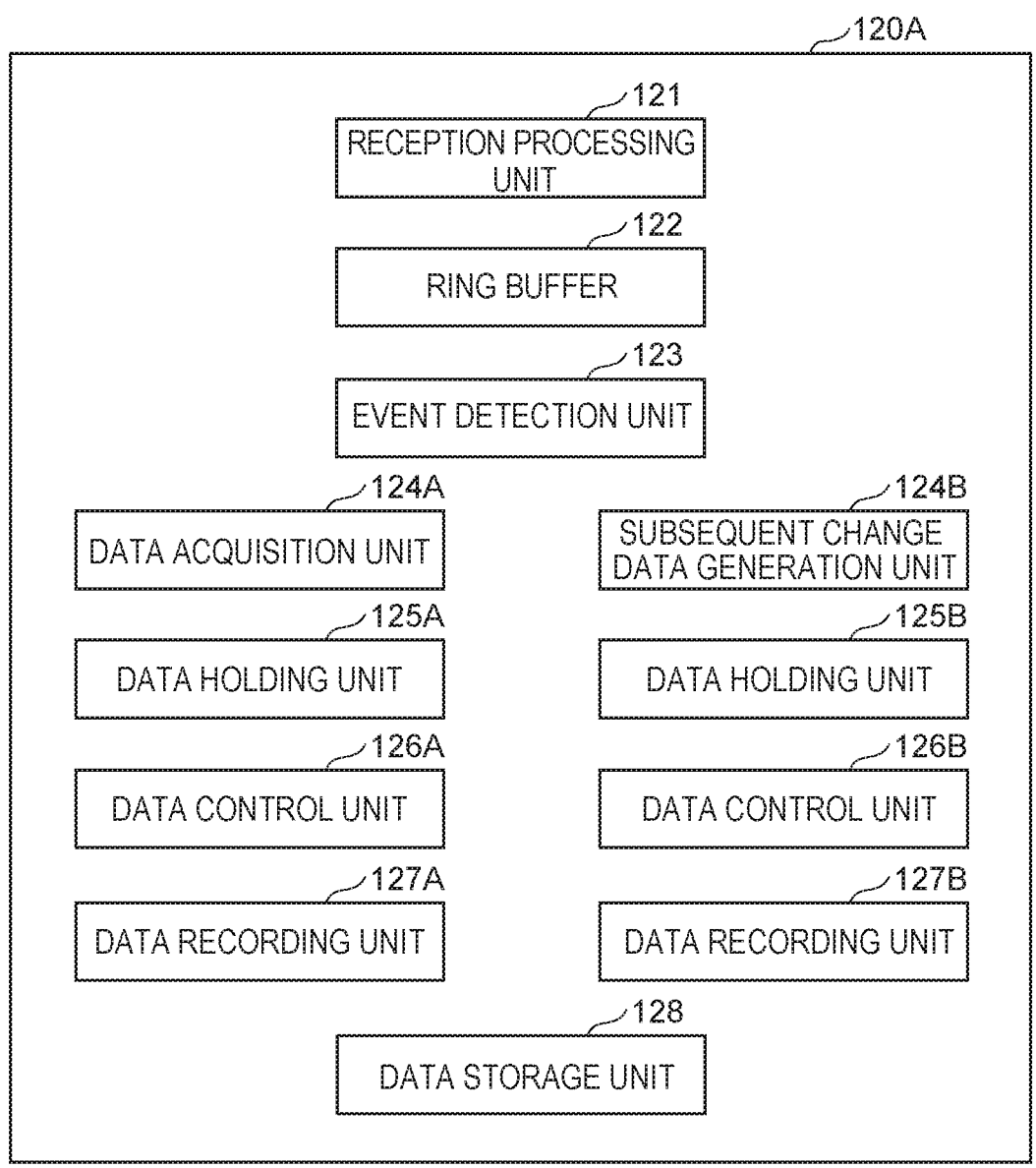
FIG. 18 illustrates the configuration of a data recording ECU in a modification of the first embodiment.

However, two nonvolatile memories may be used in place of the data recording unit 127 (nonvolatile memory 14). FIG. 18 illustrates the configuration of a data recording ECU 120A in a modification of the first embodiment.

The data recording ECU 120A includes a reception processing unit 121, a ring buffer 122, an event detection unit 123, a data acquisition unit 124A, a subsequent change data generation unit 124B, data holding units 125A, 125B, data control units 126A, 126B, data recording units 127A, 127B, and a data storage unit 128. The data recording units 127A and 127B correspond to the first recording region and the second recording region of the data recording unit 127 illustrated in FIG. 9, respectively. Since the data recording unit 127 is divided into two units, the nonvolatile memory 14 (see FIG. 4) is also divided into two memories.

The status data has a large data capacity as the status data is acquired at a specified sampling period over predetermined time after occurrence of the event, whereas the subsequent change data represents the content of a subsequent change and therefore the data capacity thereof is considerably smaller than that of the status data even with the cumulative number of times of startup and the time stamp at the time of occurrence of the subsequent change being associated therewith.

Accordingly, when the data recording units 127A and 127B implemented by two nonvolatile memories are used in placed of the data recording unit 127 (nonvolatile memory 14) illustrated in FIG. 9, an inexpensive memory with a small data capacity can be used as the nonvolatile memory (data recording unit 127B) on which the subsequent change data is recorded.

The data recording ECU 120 is part of the airbag ECU. The airbag ECU may have the configuration illustrated in FIG. 9 and may also have the functions similar to the functions of the control command generation unit 111, the event occurrence determination unit 112, the trigger state setting unit 113, and the transmission processing unit 114 of the ECU 110 illustrated in FIG. 6, so as to be able to generate a control command for deployment and actuation of the airbag. The airbag is one example of an occupant protection auxiliary device.

Second Embodiment

An in-vehicle control device and an in-vehicle recording system of the second embodiment are different from the first embodiment in the point that the data recorded on the first recording region of the data recording unit 127 (the event ID, the status data before and after occurrence of an event, and the cumulative number of times of startup and time stamp data at the time of occurrence of the event) is not associated with the data recorded on the second recording region of the data recording unit 127 (the subsequent change data representing a subsequent change occurring after occurrence of the event, and the cumulative number of times of startup and time stamp data).

Since the second embodiment is similar in other aspects to the in-vehicle control device (data recording ECU 120) and the in-vehicle recording system 100 of the first embodiment, a description is mainly given of the difference from the first embodiment. In the description below, some of the drawings of the first embodiment will be used.

In the second embodiment, the data recording ECU 120 performs the same processing as the processing of the first embodiment illustrated in FIG. 16.

In the second embodiment, when the subsequent change data and the cumulative number of times of startup and time stamp data held in association with each other in the data holding unit 125B satisfy a specified condition in step S14 of the processing illustrated in FIG. 17, the data recording ECU 120 records the data on the data recording unit 127 in step S15 of the processing illustrated in FIG. 17.

In this case, the data recorded on the first recording region of the data recording unit 127 is not associated with the data recorded on the second recording region of the data recording unit 127.

As a result, the event ID, the time before and after occurrence of the event, and the status data such as the accelerator opening illustrated in FIG. 13 are recorded in association with each other on the first recording region of the data recording unit 127. The subsequent change ID, the cumulative number of times of startup data, and the time stamp data illustrated in FIG. 14 are recorded in association with each other on the second recording region of the data recording unit 127.

In the second embodiment, since the data recorded on the first recording region of the data recording unit 127 is not associated with the data recorded on the second recording region of the data recording unit 127, the data recording ECU 120 does not generate data with the structure illustrated in FIG. 15.

After the data recorded on the first recording region of the data recording unit 127 and the data recorded on the second recording region of the data recording unit 127 are read out with the dedicated PC connected to the terminal 19 (see FIG. 4), the data recorded on the first recording region of the data recording unit 127 may be associated with the data recorded on the second recording region of the data recording unit 127 inside the dedicated PC. Association of the data may be achieved based on the cumulative number of times of startup and the time stamp.

According to the second embodiment, as in the first embodiment, it becomes possible to provide the in-vehicle control device (data recording ECU 120) and the in-vehicle recording system 100 capable of recording, upon occurrence of an event caused by the driving assist of the vehicle and the like, a reaction of an occupant to the event.

Moreover, if the data recorded on the first recording region of the data recording unit 127 and the data recorded on the second recording region of the data recording unit 127 are read out with the dedicated PC and then the read data are associated with each other inside the dedicated PC, it becomes possible to analyze how the occupant felt about actions such as vehicle control performed by the driving assist and the like as in the first embodiment.

Moreover, according to the second embodiment, the data recorded on the first recording region of the data recording unit 127 is not associated with the data recorded on the second recording region of the data recording unit 127, so that a load of the in-vehicle control device (data recording ECU 120) and the in-vehicle recording system 100 can be reduced.

Third Embodiment

An in-vehicle control device and an in-vehicle recording system of the third embodiment are different from those of the first embodiment, in the point that the data recorded on the first recording region of the data recording unit 127 is associated with the data recorded on the second recording region of the data recording unit 127 while the cumulative number of times of startup and the time stamp is not associated with the subsequent change data.

Since the third embodiment is similar in other aspects to the in-vehicle control device (data recording ECU 120) and the in-vehicle recording system 100 of the first embodiment, a description is mainly given of the difference from the first embodiment. In the description below, some of the drawings of the first embodiment will be used.

In the third embodiment, the data acquisition unit 124A acquires the cumulative number of times of startup and time stamp data at the time of occurrence of an event, and records the data on the data holding unit 125A in step S3 illustrated in FIG. 16.

The processing flow is the same as the processing flow in the first embodiment up to step S8 where the data control unit 126A records the event ID of an event that occurs, the status data held in the data holding unit 125A, and the cumulative number of times of startup and time stamp data at the time of occurrence of the event in association with each other on the data recording unit 127.

Accordingly, the data recording ECU 120 in the third embodiment records the event ID, the time before and after occurrence of the event, and the status data such as the accelerator opening illustrated in FIG. 13 in association with each other on the first recording region of the data recording unit 127.

In the third embodiment, when the subsequent change data generation unit 124B determines that a subsequent change occurs (S12: YES), the subsequent change data generation unit 124B generates the subsequent change data representing the subsequent change that occurs, but does not acquire the cumulative number of times of startup and time stamp data representing the time of occurrence of the subsequent change.

As a result, in step S13, the subsequent change data generation unit 124B records the subsequent change data on the data holding unit 125B. At this time, the cumulative number of times of startup and the time stamp are not associated with the subsequent change data.

Then, in step S15, the data control unit 126B records the subsequent change data held in the data holding unit 125B in association with the status data recorded on the data recording unit 127. In this case, the data control unit 126B does not determine whether or not the subsequent change data satisfies the specified condition.

Thus, since the in-vehicle control device and the in-vehicle recording system of the third embodiment do not associate the cumulative number of times of startup and the time stamp with the subsequent change data, the data recorded on the second recording region of the data recording unit 127 is as illustrated in FIG. 19.

FIG. 19 illustrates data recorded on the second recording region of the data recording unit 127 in the in-vehicle control device and the in-vehicle recording system of the third embodiment.

As illustrated in FIG. 19, the data recorded on the second recording region of the data recording unit 127 includes only the subsequent change ID. This is because only the subsequent change ID representing the subsequent change occurring within γ minutes after occurrence of the event is recorded on the second recording region of the data recording unit 127.

In such a third embodiment, the data recorded on the data recording unit 127 in the end is as illustrated in FIG. 20.

FIG. 20 illustrates data recorded on the data recording unit 127 by the data recording ECU 120 in the third embodiment.

As illustrated in FIG. 20, the subsequent change data is not in association with the cumulative number of times of startup and the time stamp. This is because in the third embodiment, the cumulative number of times of startup and the time stamp are not associated with the subsequent change data.

In the data recorded on the data recording unit 127 by the data recording ECU 120 in the third embodiment, the subsequent change data is not in association with the cumulative number of times of startup and the time stamp, but the cumulative number of times of startup and time stamp data at the time of occurrence of the event, the event ID, the status data, and the subsequent change data are recorded in association with each other.

As illustrated in FIG. 13, the cumulative number of times of startup and time stamp data at the time of occurrence of the event and the status data are recorded on the data recording unit 127 in association with the event ID.

Therefore, according to the third embodiment, it becomes possible to provide the in-vehicle control device (data recording ECU 120) and the in-vehicle recording system 100 capable of recording, upon occurrence of an event relating to the driving assist of the vehicle and the like, a reaction of the occupant to the event.

As described in the foregoing, according to the in-vehicle recording system 100 of the third embodiment, when an event occurs, the status data generated before and after occurrence of the event, the cumulative number of times of startup and time stamp data at the time of occurrence of the event, and the subsequent change data representing a subsequent change occurring during predetermined time after occurrence of the event can be recorded in association with each other on the data recording unit 127 (nonvolatile memory 14).

The subsequent change data representing a subsequent change occurring during the predetermined time after occurrence of the event is not associated with the cumulative number of times of startup and time stamp data at the time of occurrence of the subsequent change. However, since the subsequent change data is the data obtained during the predetermined time after occurrence of the event, it becomes possible to analyze how the occupant felt about the action such as control on the vehicle by the driving assist and the like by reading out the data with the dedicated PC.

Fourth Embodiment

An in-vehicle control device and an in-vehicle recording system of a fourth embodiment are different from those of the first embodiment in the point that the cumulative number of times of startup and the time stamp are not associated with the subsequent change data and that the data recorded on the first recording region of the data recording unit 127 (the event ID, the status data before and after occurrence of an event, and the cumulative number of times of startup and time stamp data at the time of occurrence of the event) is not associated with the data recorded on the second recording region of the data recording unit 127 (the subsequent change data representing a subsequent change occurring after occurrence of the event).

Since the fourth embodiment is similar in other aspects to the in-vehicle control device (data recording ECU 120) and the in-vehicle recording system 100 of the first embodiment, a description is mainly given of the difference from the first embodiment. In the description below, some of the drawings of the first embodiment will be used.

In the fourth embodiment, the data recording ECU 120 performs the same processing as the processing of the first embodiment illustrated in FIG. 16.

In the fourth embodiment, the data recording ECU 120 records on the data recording unit 127 the subsequent change data held in the data holding unit 125B in step S15 of the processing illustrated in FIG. 17. In this case, since the subsequent change data is not in association with the cumulative number of times of startup and the time stamp, the data control unit 126B does not determine whether or not the subsequent change data satisfies the specified condition.

Furthermore, in this case, the data recorded on the first recording region of the data recording unit 127 is not associated with the data recorded on the second recording region of the data recording unit 127.

As a result, the event ID, the time before and after occurrence of the event, and the status data such as the accelerator opening illustrated in FIG. 13 are recorded in association with each other on the first recording region of the data recording unit 127. The subsequent change ID illustrated in FIG. 19 is also recorded on the second recording region of the data recording unit 127.

In this case, an address of the second recording region on which the subsequent change ID is recorded may be predetermined in relation to the first recording region.

For example, the address of the first recording region of the data recording unit 127, on which the status data such as the event ID of an event that occurs, the time before and after occurrence of the event, and the accelerator opening is recorded, and the address of the second recording region, on which the subsequent change ID of a subsequent change that occurs after occurrence of the event is recorded, may be predetermined based on an address map. Such a technique is particularly effective when the data recording unit 127 has enough capacity.

By using such a technique, the data recorded on the first recording region of the data recording unit 127, and the data recorded on the second recording region of the data recording unit 127 may be read out with the dedicated PC connected to the terminal 19 (see FIG. 4), and then the data recorded on the first recording region of the data recording unit 127 and the data recorded on the second recording region of the data recording unit 127 may be associated with each other inside the dedicated PC using the address map.

According to the fourth embodiment, as in the first embodiment, it becomes possible to provide the in-vehicle control device (data recording ECU 120) and the in-vehicle recording system 100 capable of recording, upon occurrence of an event caused by the driving assist of the vehicle and the like, a reaction of the occupant to the event.

Moreover, if the data recorded on the first recording region of the data recording unit 127 and the data recorded on the second recording region of the data recording unit 127 are read out with the dedicated PC and then the read data are associated with each other inside the dedicated PC, it becomes possible to analyze how the occupant felt about actions such as vehicle control performed by the driving assist and the like as in the first embodiment.

Moreover, according to the fourth embodiment, the data recorded on the first recording region of the data recording unit 127 is not associated with the data recorded on the second recording region of the data recording unit 127, so that a load of the in-vehicle control device (data recording ECU 120) and the in-vehicle recording system 100 can be reduced.

Instead of using the address map as described before, only the event ID relating to occurrence of one event, the status data before and after occurrence of the event, and the cumulative number of times of startup and time stamp data at the time of occurrence of the event may be recorded on the first recording region of the data recording unit 127, and only the subsequent change ID relating to occurrence of the one event may be recorded on the second recording region of the data recording unit 127.

In this case, after the data recorded on the first recording region of the data recording unit 127 and the data recorded on the second recording region of the data recording unit 127 are read out with the dedicated PC, the read data can be associated with each other more easily.

Although the in-vehicle control device and the in-vehicle recording system according to the exemplary embodiments of the present disclosure have been described in the foregoing, the present disclosure is not limited to the embodiments concretely disclosed, and various deformations and modifications are possible without departing from the appended claims.

What is claimed is:

1. An in-vehicle recording system of a vehicle, comprising:
   a detector including at least a front camera;
   an electronic control unit configured to control a rudder angle to keep the vehicle within a traveling lane based on information on at least images in front of the vehicle detected by the front camera;
   a control area network;
   a gateway device connected to the control area network;
   a data recording electronic control unit configured to sequentially record a status data that includes at least images transferred through the control area network and the gateway device, and
   when an event occurs, record on a nonvolatile memory the status data relating to the event that occurs, among the status data over a predetermined time before and after occurrence of the event.

2. The in-vehicle recording system according to claim 1, wherein the event includes
   detection of collision between the vehicle and another object.

3. The in-vehicle recording system according to claim 2, wherein
   the data recording electronic control unit configured to, when the event occurs, record on the nonvolatile memory a status data of the vehicle or a status data of an occupant of the vehicle over the predetermined time before and after occurrence of the event.

4. The in-vehicle recording system according to claim 3, wherein
   the status data of the vehicle includes at least one of a vehicle driving status, a vehicle control status, a vehicle traveling status, a vehicle operation status, a vehicle attribute, and a vehicle environment status, and
   the status data of the occupant of the vehicle includes at least one of a state representing whether a driver of the vehicle looks away, which is detected based on an image of the driver acquired with a camera disposed in a vehicle cabin, or a heart rate of the driver detected with a heart rate detection electrode disposed in the vehicle cabin.

5. The in-vehicle recording system according to claim 2, wherein
   the status data includes a status of a driving assist function including a status of a lane keeping assist control state.

* * * * *